(12) United States Patent
Jung et al.

(10) Patent No.: US 12,547,272 B2
(45) Date of Patent: Feb. 10, 2026

(54) SENSOR DEVICE AND DRIVING METHOD THEREOF

(71) Applicant: Samsung Display Co., LTD., Yongin-si (KR)

(72) Inventors: Keum Dong Jung, Yongin-si (KR); Jang Hui Kim, Yongin-si (KR); Ji Hoon Kim, Yongin-si (KR); Sang Hun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/896,421

(22) Filed: Sep. 25, 2024

(65) Prior Publication Data

US 2025/0147623 A1    May 8, 2025

(30) Foreign Application Priority Data

Nov. 6, 2023  (KR) .......................... 10-2023-0151712

(51) Int. Cl.
*G06F 3/041*    (2006.01)
*G06F 3/044*    (2006.01)

(52) U.S. Cl.
CPC ........ *G06F 3/04166* (2019.05); *G06F 3/0443* (2019.05); *G06F 3/0446* (2019.05)

(58) Field of Classification Search
None
See application file for complete search history.

(56) References Cited

U.S. PATENT DOCUMENTS 11,042,241 B2    6/2021    Bok et al.
11,537,252 B2    12/2022    Lee et al.

FOREIGN PATENT DOCUMENTS

KR    10-2013-0056445 A    5/2013
KR       10-2305463 B1    9/2021
KR    10-2022-0023878 A    3/2022

*Primary Examiner* — Aneeta Yodichkas
(74) *Attorney, Agent, or Firm* — Womble Bond Dickinson (US) LLP

(57) ABSTRACT

A sensor device includes: a sensor layer including first sensors, and second sensors forming a capacitance with the first sensors; and a sensor driver configured to transmit driving signals to the first sensors, and receive sensing signals from the second sensors, during a touch sensing period. The sensor driver is further configured to transmit first driving signals to at least some of the first sensors, and second driving signals to at least some of the second sensors, during an object sensing period different from the touch sensing period. During the object sensing period, the first driving signals applied to the first sensors located at an edge of the sensor layer are different from the first driving signals applied to the first sensors located at a central portion of the sensor layer in at least one of a voltage level, frequency, phase, or code.

22 Claims, 27 Drawing Sheets

SENSOR DEVICE AND DRIVING METHOD THEREOF

CROSS-REFERENCE TO RELATED APPLICATION

The present application claims priority to and the benefit of Korean Patent Application No. 10-2023-0151712, filed on Nov. 6, 2023, in the Korean Intellectual Property Office, the entire disclosure of which is incorporated herein by reference.

BACKGROUND

1. Field

Aspects of embodiments of the present disclosure relate to a sensor device and a driving method thereof.

2. Description of the Related Art

As information technology has developed, the importance of a display device, which is a connection medium between a user and information, has been highlighted. Accordingly, the use of display devices, such as a liquid crystal display device, an organic light emitting display device, and the like, has been increasing.

A display device may include a sensor device. The sensor device may sense a user's touch or an object corresponding to an image of the display device, and use it as an input signal.

The sensor device may include a plurality of sensors. When an object is positioned in a central area of the sensor device, the object may transmit and receive signals to and from a sufficient number of sensors. Accordingly, transmission and reception of signals between the object and the sensor device may be smooth.

The above information disclosed in this Background section is for enhancement of understanding of the background of the present disclosure, and therefore, it may contain information that does not constitute prior art.

SUMMARY

When an object is positioned in an edge area or outside of the sensor device, the object may transmit and receive signals to and from a relatively smaller number of sensors. Accordingly, transmission and reception of signals between the object and the sensor device may not be smooth.

Embodiments of the present disclosure may be directed to a sensor device that may smoothly transmit and receive signals, even if the object is located at an edge of or outside of the sensor device, and a method thereof.

According to one or more embodiments of the present disclosure a sensor device includes: a sensor layer including first sensors, and second sensors forming a capacitance with the first sensors; and a sensor driver configured to transmit driving signals to the first sensors, and receive sensing signals from the second sensors, during a touch sensing period. The sensor driver is further configured to transmit first driving signals to at least some of the first sensors, and second driving signals to at least some of the second sensors, during an object sensing period different from the touch sensing period. During the object sensing period, the first driving signals applied to the first sensors located at an edge of the sensor layer are different from the first driving signals applied to the first sensors located at a central portion of the sensor layer in at least one of voltage level, a frequency, a phase, or a code.

In some embodiments, during the object sensing period, the second driving signals applied to the second sensors located at the edge of the sensor layer may be different from the second driving signals applied to the second sensors located at the central portion of the sensor layer in at least one of a voltage level, a frequency, a phase, or a code.

In some embodiments, during the object sensing period, the first driving signals applied to the first sensors located at the edge of the sensor layer may have a higher signal-to-noise ratio (SNR) than that of the first driving signals applied to the first sensors located at the central portion of the sensor layer.

In some embodiments, during the object sensing period, voltage levels of the first driving signals applied to the first sensors located at the edge of the sensor layer may be different from voltage levels of the first driving signals applied to the first sensors located at the central portion of the sensor layer.

In some embodiments, during the object sensing period, voltage levels of the first driving signals applied to the first sensors located at the edge of the sensor layer may be greater than voltage levels of the first driving signals applied to the first sensors located at the central portion of the sensor layer.

In some embodiments, during the object sensing period, phases of the first driving signals applied to the first sensors located at the edge of the sensor layer may be different from phases of the first driving signals applied to the first sensors located at the central portion of the sensor layer.

In some embodiments, during the object sensing period, a phase difference between the first driving signals applied to the first sensors located at the edge of the sensor layer may be smaller than a phase difference between the first driving signals applied to the first sensors located at the central portion of the sensor layer.

In some embodiments, during the object sensing period, phases of the first driving signals applied to the first sensors located at the edge of the sensor layer may be set to cause more constructive interference than the phases of the first driving signals applied to the first sensors located at the central portion of the sensor layer.

In some embodiments, during the object sensing period, frequencies of the first driving signals applied to the first sensors located at the edge of the sensor layer may be different from frequencies of the first driving signals applied to the first sensors located at the central portion of the sensor layer.

In some embodiments, during the object sensing period, frequencies of the first driving signals applied to the first sensors located at the edge of the sensor layer may be set to cause more constructive interference than the frequencies of the first driving signals applied to the first sensors located at the central portion of the sensor layer.

In some embodiments, during the object sensing period, codes of the first driving signals applied to the first sensors located at the edge of the sensor layer may be different from codes of the first driving signals applied to the first sensors located at the central portion of the sensor layer.

In some embodiments, during the object sensing period, codes of the first driving signals applied to the first sensors located at the edge of the sensor layer may cause more constructive interference than those of codes of the first driving signals applied to the first sensors located at the central portion of the sensor layer.

According to one or more embodiments of the present disclosure a driving method of a sensor device including a sensor layer including first sensors, and second sensors forming a capacitance with the first sensors, includes applying first driving signals to at least some of the first sensors, the first driving signals applied to the first sensors located at an edge of the sensor layer being different from the first driving signals applied to the first sensors located at a central portion of the sensor layer in at least one of a voltage, a frequency, a phase, or a code. The method further includes applying second driving signals to at least some of the second sensors, the second driving signals applied to the second sensors located at the edge of the sensor layer being different from the second driving signals applied to the second sensors located at the central portion of the sensor layer in at least one of a voltage level, a frequency, a phase, or a code.

In some embodiments, the first driving signals applied to the first sensors located at the edge of the sensor layer may have a higher signal-to-noise ratio (SNR) than that of the first driving signals applied to the first sensors located at the central portion of the sensor layer.

In some embodiments, voltage levels of the first driving signals applied to the first sensors located at the edge of the sensor layer may be greater than voltage levels of the first driving signals applied to the first sensors located at the central portion of the sensor layer.

In some embodiments, a phase difference between the first driving signals applied to the first sensors located at the edge of the sensor layer may be smaller than a phase difference between the first driving signals applied to the first sensors located at the central portion of the sensor layer.

In some embodiments, phases of the first driving signals applied to the first sensors located at the edge of the sensor layer may be set to cause more constructive interference than phases of the first driving signals applied to the first sensors located at the central portion of the sensor layer.

In some embodiments, frequencies of the first driving signals applied to the first sensors located at the edge of the sensor layer may be set to cause more constructive interference than frequencies of the first driving signals applied to the first sensors located at the central portion of the sensor layer.

In some embodiments, codes of the first driving signals applied to the first sensors located at the edge of the sensor layer are may be to cause more constructive interference than codes of the first driving signals applied to the first sensors located at the central portion of the sensor layer.

In some embodiments, the at least one of the voltage, the frequency, the phase, or the code of the first driving signals applied to the first sensors located at the edge of the sensor layer may cause more constructive interference than the at least one of the voltage, the frequency, the phase, or the code of the first driving signals applied to the first sensors located at the central portion of the sensor layer.

According to one or more embodiments of the present disclosure, a sensor layer includes: first sensors, and second sensors crossing the first sensors; and a sensor driver configured to transmit first driving signals to the first sensors, and receive sensing signals from the second sensors, during a first sensing period. The sensor driver is configured to transmit second driving signals different from the first driving signals to at least two of the first sensors during a second sensing period different from the first sensing period. During the second sensing period, the second driving signal applied to the first sensor located at an edge of the sensor layer is different from the second driving signals applied to the first sensor located at a central portion of the sensor layer in at least one of a voltage level, a frequency, a phase, or a code.

In some embodiments, the first driving signals may be signals used to detect a position of a first object; and the second driving signals may be signals used to detect a position of a second object that is different from the first object.

According to one or more embodiments of the present disclosure, a display device and the driving method thereof may smoothly transmit and receive signals, even if an object is positioned at an edge or outside of a sensor device.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
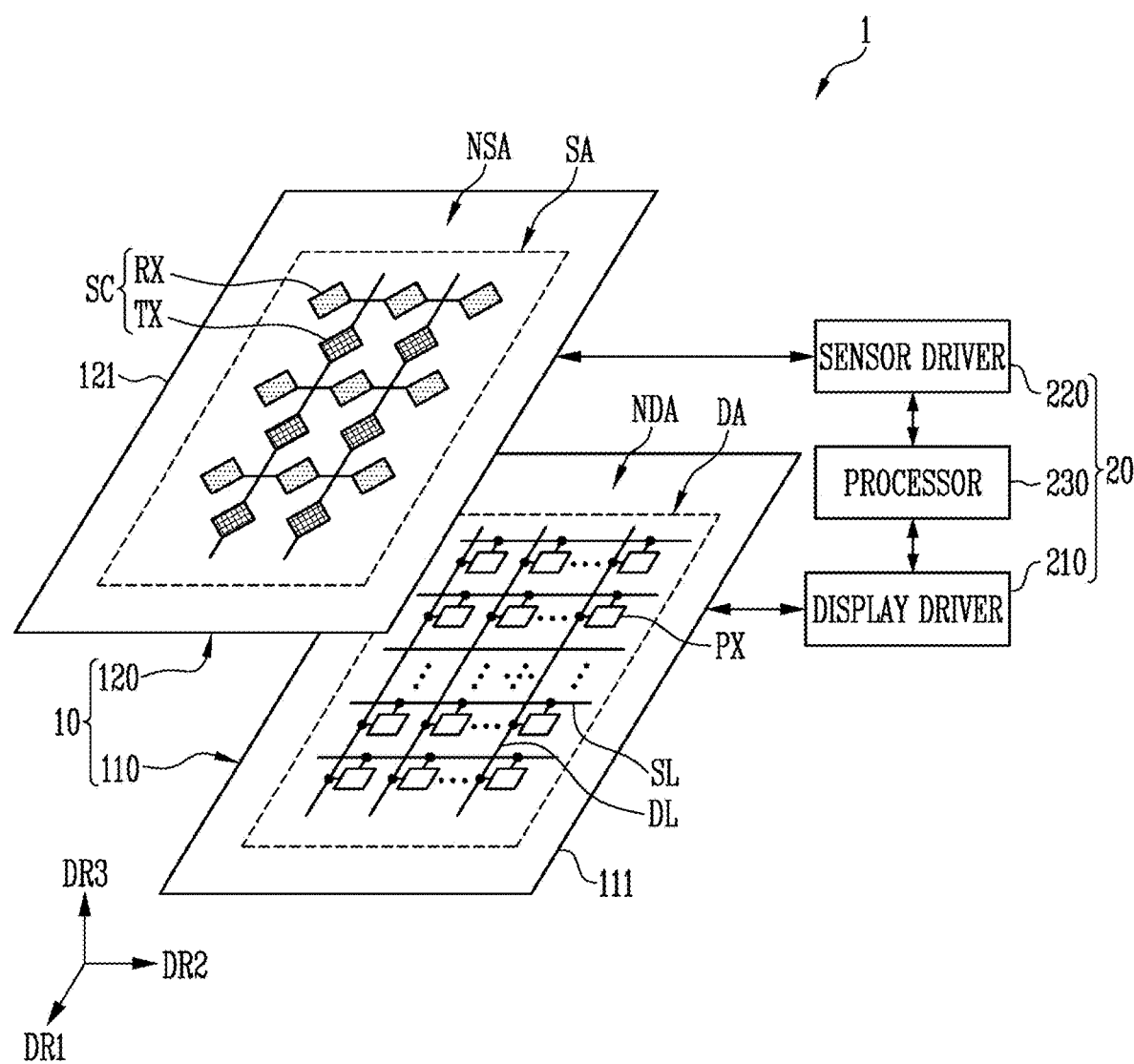
FIG. 1 is a perspective view illustrating a display device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. FIG. 1 is a drawing for explaining a display device according to some embodiments of the present disclosure.

Referring to FIG. 1, a display device 1 according to some embodiments of the present disclosure may include a panel 10 and a driving circuit portion 20 for driving the panel 10.

For example, the panel 10 may include a display unit (e.g., a display or display layer) 110 for displaying an image, and a sensor unit (e.g., a sensor or a sensor layer) 120 for sensing a touch, a pressure, a fingerprint, and/or hovering. For example, the panel 10 may include pixels PX, and sensors SC disposed to overlap with at least some of the pixels PX. In some embodiments, the sensors SC may include first sensors TX and second sensors RX. In other embodiments (e.g., a self-capacitance method), the sensors SC may be configured as one kind of sensor (e.g., as one sensor) without distinction between the first sensors and the second sensors. The driving circuit portion 20 may include a display driver 210 for driving the display unit 110, and a sensor driver 220 for driving the sensor unit 120. For example, the pixels PX may display an image in units of a display frame period. For example, the sensors SC may sense a user input in units of a sensing frame period. The sensing frame period and the display frame period may be independent of each other and may be different from each other. The sensing frame period and the display frame period may be synchronized, or may not be synchronized. For example, the sensing frame period and the display frame period may be the same or substantially the same as each other.

In some embodiments, the display unit 110 and the sensor unit 120 may be separately manufactured from each other. The display unit 110 and the sensor unit 120 may be disposed and/or be combined with each other, so that at least one area of the display unit 110 and at least one area of the sensor unit 120 overlap with each other. As another example, in some embodiments, the display unit 110 and the sensor unit 120 may be integrally manufactured with each other. For example, the sensor unit 120 may be directly formed on at least one substrate (e.g., an upper and/or lower substrate of a display panel, or a thin film encapsulation layer) forming the display unit 110, or on other insulating layers or various suitable functional films (e.g., an optical layer or a passivation layer).

In FIG. 1, the sensor unit 120 is shown to be disposed on a front surface (e.g., an upper surface on which an image is displayed) of the display unit 110, but the position of the sensor unit 120 is not limited thereto. For example, in other embodiments, the sensor unit 120 may be disposed on a rear surface or on respective surfaces of the display unit 110. In some embodiments, the sensor unit 120 may be disposed on at least one edge area of the display unit 110.

The display unit 110 may include a display substrate 111, and a plurality of pixels PX formed on the display substrate 111. The pixels PX may be disposed in a display area DA of the display substrate 111. The display area DA may be a plane defined by a first direction DR1, and a second direction DR2 perpendicular to or substantially perpendicular to the first direction DR1. A display direction of the display area DA may be a third direction DR3 perpendicular to or substantially perpendicular to the first and second directions DR1 and DR2. In some embodiments, the display area DA may be flat or substantially flat, or may be curved.

The display substrate 111 may include the display area DA in which an image is displayed, and a non-display area NDA outside the display area DA. In some embodiments, the display area DA may be disposed in a central area of the display unit 110, and the non-display area NDA may be disposed in an edge area of the display unit 110 so as to surround (e.g., around a periphery of) the display area DA.

The display substrate 111 may be a rigid substrate or a flexible substrate, but its materials or physical properties are not particularly limited thereto. For example, the display substrate 111 may be a rigid substrate including (e.g., made of) glass or tempered glass, or a flexible substrate formed of a thin film including (e.g., made of) plastic or a metallic material.

Scan lines SL and data lines DL may be disposed in the display area DA. The pixels PX may be connected to the scan lines SL and the data lines DL. The pixels PX may be selected by a scan signal of a turn-on level supplied from the scan lines SL, receive a data signal from the data lines DL, and emit light having a luminance corresponding to the data signal. Accordingly, an image corresponding to the data signal is displayed in the display area DA. However, the structure and driving method of the pixels PX are not particularly limited thereto. For example, the pixels PX may be implemented to have various suitable structures and driving methods as would be understood to those having ordinary skill in the art.

Various wires connected to the pixels PX of the display area DA and/or internal circuit portions may be disposed in the non-display area NDA. For example, a plurality of wires for supplying various power sources and control signals to the display area DA may be disposed in the non-display area NDA, and in addition, a scan driver and/or the like may be further disposed in the non-display area NDA.

As used in the present disclosure, the type of the display unit 110 is not particularly limited. For example, the display unit 110 may be implemented as a self-light emitting type display panel, such as an organic light emitting display panel. However, when the display unit 110 is implemented as a self-light emitting type, each pixel is not limited to a case where only an organic light emitting element is included. For example, the light emitting element of each pixel may include an organic light emitting diode, an inorganic light emitting diode, and/or a quantum dot/well light emitting diode. Each pixel may be provided with a plurality of light emitting elements. In this case, the plurality of light emitting elements may be connected in series, in parallel, or in series/parallel. As another example, the display unit 110 may be implemented as a non-light emitting type of display panel, such as a liquid crystal display panel. When the display unit 110 is implemented in a non-light emitting type, the display device 1 may additionally include a light source such as a back-light unit (e.g., a backlight).

The sensor unit 120 may include a sensor substrate 121 and the plurality of sensors SC formed on the sensor substrate 121. The sensors SC may be disposed in a sensing area SA on the sensor substrate 121.

The sensor substrate 121 may include the sensing area SA capable of sensing a touch input or the like, and a peripheral area NSA outside the sensing area SA. In some embodiments, the sensing area SA may be disposed to overlap with at least one area of the display area DA. For example, the sensing area SA may be an area corresponding to the display area DA (e.g., an area overlapping with the display area DA), and the peripheral area NSA may be an area corresponding to the non-display area NDA (e.g., an area overlapping with the non-display area NDA). In this case, when a user input (touch input, object input, or the like) is provided on the display area DA, the user input may be detected through the sensor unit 120. The sensing area SA may be an area larger than the display area DA. For example, a portion of the sensing area SA may cover the display area DA, and another portion of the sensing area SA may cover an area outside the display area DA. Depending on the structure of the sensor unit 120, the sensing range of the outer portion of the sensing area SA may be smaller than the sensing range of the central portion of the sensing area SA. Accordingly, in order to make the sensing sensitivity of the outer portion of the sensing area SA the same or substantially the same as the sensing sensitivity of the central portion of the sensing area SA, at least a portion of the sensing area SA may be larger than the display area DA.

The sensor substrate 121 may be a rigid or flexible substrate, and may be configured with at least one insulating film. When the sensor substrate 121 is configured with one insulating film, first sensor electrodes may be disposed under the insulating film, and second sensor electrodes may be disposed above the insulating film. In some embodiments, the sensor substrate 121 may be configured with two insulating films. In this case, the first sensor electrodes may be disposed under the first insulating film, and the second sensor electrodes may be disposed between the first insulating film and the second insulating film. The third sensor electrodes may be disposed on the second insulating film. As such, the sensors SC for sensing the user input or the like may be disposed in the sensing area SA. In this case, the first sensor electrodes may be disposed under the first insulating film, and the second sensor electrodes may be disposed between the first insulating film and the second insulating film. The third sensor electrodes may be disposed between the second insulating film and the third insulating film, and the fourth sensor electrodes may be disposed on the third insulating film. In some embodiments, the first sensor electrodes, the second sensor electrodes, the third sensor electrodes, and the fourth sensor electrodes may be electrodes that detect one type of sensing (e.g., one type of user input). In some embodiments, the first sensor electrodes and the second sensor electrodes may be electrodes that detect a first type of sensing, and the third sensor electrodes and the fourth sensor electrodes may be electrodes that detect a second type of sensing that is different from the first type of sensing. For example, the first type of sensing may be a sensing method that detects a user's touch. The second type of sensing may be a sensing method that detects an object such as an active pen. In this case, the third and fourth sensor electrodes that perform the second type of sensing may be charging or sensing electrodes for electromagnetic generation.

In addition, the sensor substrate 121 may be a transparent or translucent transmissive substrate, but is not limited thereto. The material and physical properties of the sensor substrate 121 are not particularly limited. For example, the sensor substrate 121 may be a rigid substrate including (e.g., made of) glass or tempered glass, or a flexible substrate formed of a thin film including (e.g., made of) plastic or a metallic material. In addition, in some embodiments, at least one substrate forming the display unit 110 (e.g., the display substrate 111, an encapsulation substrate, and/or a thin film encapsulation layer), or at least one layer of insulating film or functional film disposed on an inner and/or outer surfaces of the display unit 110, may be used as the sensor substrate 121.

The sensing area SA is set as an area capable of reacting to a user input (e.g., an active area of a sensor). As such, the sensors SC for sensing the user input may be disposed in the sensing area SA. In some embodiments, the sensors SC may include the first sensors TX and the second sensors RX.

For example, the first sensors TX may extend in a first direction DR1. The first sensors TX may be spaced apart from each other in the second direction DR2, and may be arranged parallel to each other. The second direction DR2 may be different from the first direction DR1. For example, the second direction DR2 may be a direction orthogonal to the first direction DR1. In some embodiments, the extension direction and the arrangement direction of the first sensors TX may follow other suitable configurations. Each of the first sensors TX may have a structure in which first cells having a relatively larger area and first bridges having a relatively narrower area are connected to each other. In FIG. 1, each first cell is illustrated in a diamond shape, but may have various suitable shapes, such as a circle, a quadrangle, a triangle, and/or a mesh form. For example, the first bridges may be integrally formed at (e.g., in or on) the same or substantially the same layer as that of the first cells. In some embodiments, the first bridges may be formed in a different layer from that of the first cells to electrically connect adjacent first cells to each other.

For example, each second sensor RX may extend in the second direction DR2. The second sensors RX may be spaced apart from each other in the first direction DR1, and may be arranged parallel to each other. In some embodiments, the extension direction and the arrangement direction of the second sensors RX may follow other suitable configurations. Each second sensor RX may have a structure in which second cells having a relatively larger area and second bridges having a relatively narrower area are connected to each other. In FIG. 1, each second cell is illustrated in a diamond shape, but may have various suitable shapes, such as a circle, a quadrangle, a triangle, and/or a mesh form. For example, the second bridges may be integrally formed at (e.g., in or on) the same layer as that of the second cells. In some embodiments, the second bridges may be formed in a different layer from that of the second cells to electrically connect adjacent second cells to each other.

For example, the first cells of the first sensors TX and the second cells of the second sensors RX may be formed at (e.g., in or on) the same conductive layer. In this case, the first bridges of the first sensors TX and the second bridges of the second sensors RX may be formed at (e.g., in or on) different conductive layers with an insulating layer therebetween. For example, when the first bridges of the first sensors TX are formed at (e.g., in or on) the same layer as the first cells and the second cells, the second bridges of the second sensors RX may be formed in different layers from that of the first bridges, the first cells, and the second cells with an insulating layer therebetween. When the second bridges of the second sensors RX are formed at (e.g., in or on) the same layer as the first cells and the second cells, the first bridges of the first sensors TX may be formed in different layers from that of the second bridges, the first cells, and the second cells with an insulating layer therebetween.

As another example, the first cells of the first sensors TX and the second cells of the second sensors RX may be formed at (e.g., in or on) different conductive layers with an insulating layer therebetween. In this case, the first cells and first bridges of the first sensors TX may be formed at (e.g., in or on) the same conductive layer. In addition, the second cells and second bridges of the second sensors RX may be formed at (e.g., in or on) the same conductive layer.

In some embodiments, each of the first sensors TX and of the second sensors RX may have a conductivity by including at least one of a metallic material, a transparent conductive material, and/or various other conductive materials. For example, the first sensors TX and the second sensors RX may include at least one of various suitable metallic materials, such as gold (Au), silver (Ag), aluminum (Al), molybdenum (Mo), chromium (Cr), titanium (Ti), nickel (Ni), neodymium (Nd), copper (Cu), platinum (Pt), and/or a suitable alloy thereof. In this case, the first sensors TX and the second sensors RX may be configured in a mesh form. In addition, the first sensors TX and the second sensors RX may include at least one of various transparent conductive materials, such as a silver nanowire (AgNW), an indium tin oxide (ITO), an indium zinc oxide (IZO), an indium gallium zinc oxide (IGZO), an antimony zinc oxide (AZO), an indium tin zinc oxide (ITZO), a zinc oxide (ZnO), a tin oxide (SnO2), a carbon nano tube, and/or a graphene. In addition, the first sensors TX and the second sensors RX may have a conductivity by including at least one of various suitable conductive materials. In addition, each of the first sensors TX and the second sensors RX may include (e.g., may be made of) a single layer or multilayers, but the cross-sectional structure thereof is not particularly limited thereto.

Sensor lines for electrically connecting the sensors TX and RX to the sensor driver 220 and the like may be disposed in the peripheral area NSA of the sensor unit 120.

The driving circuit 20 may include the display driver 210 for driving the display unit 110, and the sensor driver 220 and a processor 230 for driving the sensor unit 120. The processor 230 may control software and hardware of the display device 1. For example, the processor 230 may include at least one of a central processing unit (CPU), an application processor (AP), a graphics processing unit (GPU), a communication processor (CP), an image signal processor (ISP), and/or a neural processing unit (NPU). The processor 230 may control the display driver 210 and the sensor driver 220 by providing instructions, timing signals, data, and the like.

In some embodiments, the display driver 210 and the sensor driver 220 may be configured of different integrated chips from each other. In some embodiments, at least a portion of the display driver 210 and the sensor driver 220 may be integrated together in one integrated chip (IC).

The display driver 210 is electrically connected to the display unit 110 to drive the pixels PX. For example, the display driver 210 may include a data driver and a timing controller, and a scan driver may be separately mounted in the non-display area NDA of the display unit 110. In some embodiments, the display driver 210 may include all or at least some of the data driver, the timing controller, and/or the scan driver.

The sensor driver 220 is electrically connected to the sensor unit 120 to drive the sensor unit 120. The sensor driver 220 may include a sensor transmitter and a sensor receiver. In some embodiments, the sensor transmitter and the sensor receiver may be integrated together into one IC, but the present disclosure is not limited thereto.

Figure 2:
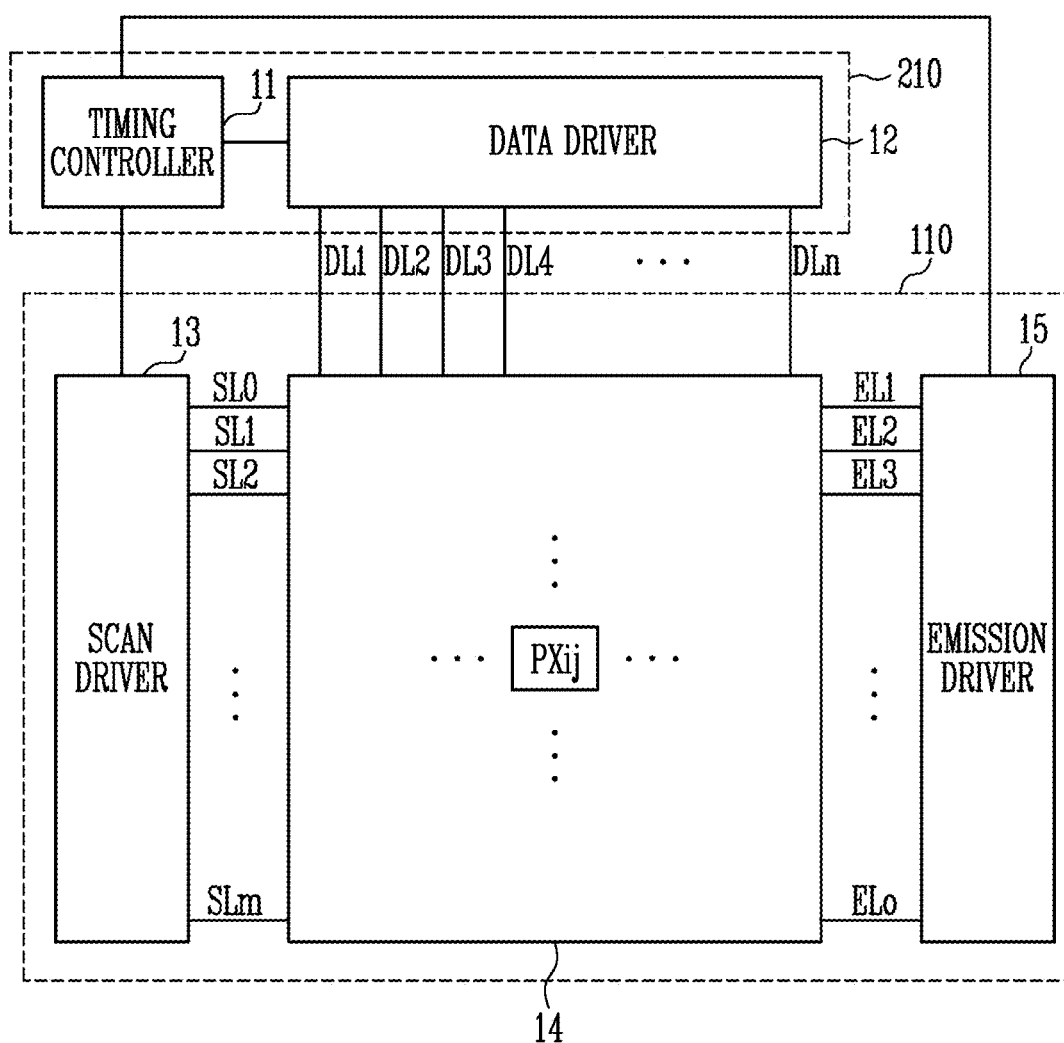
FIGS. 2-4 illustrate a display unit and a display driver according to one or more embodiments of the present disclosure.
Figure 3:
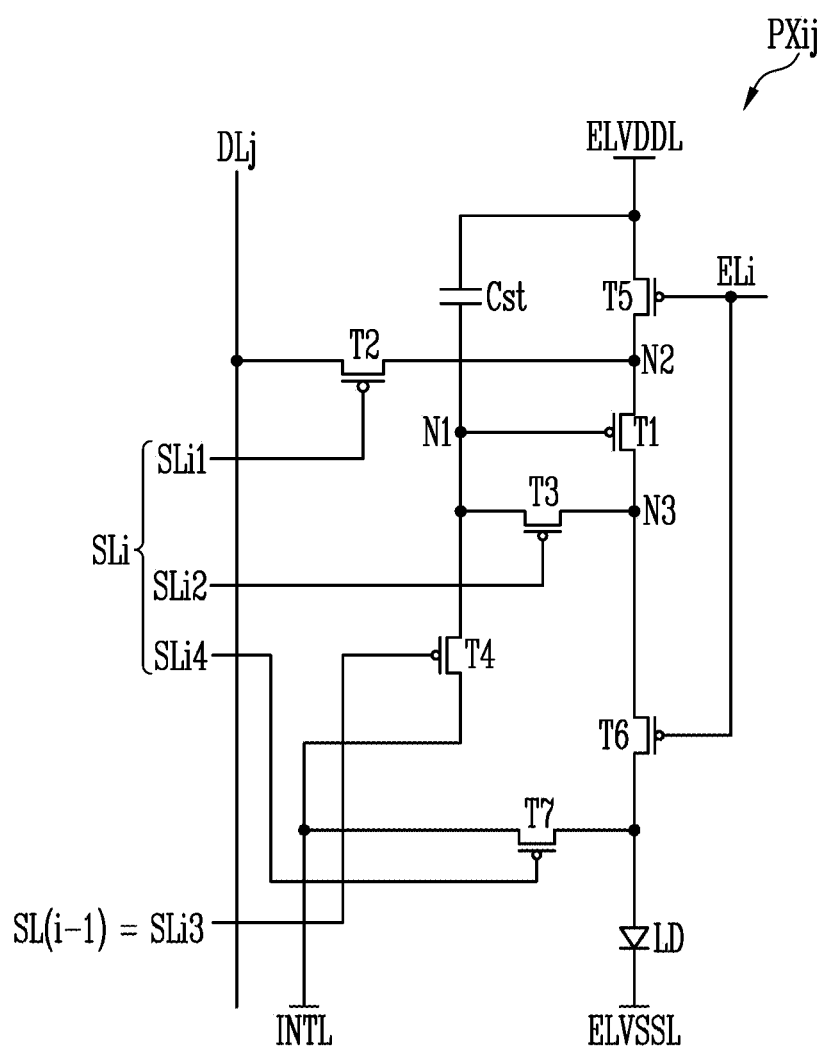
Figure 4:
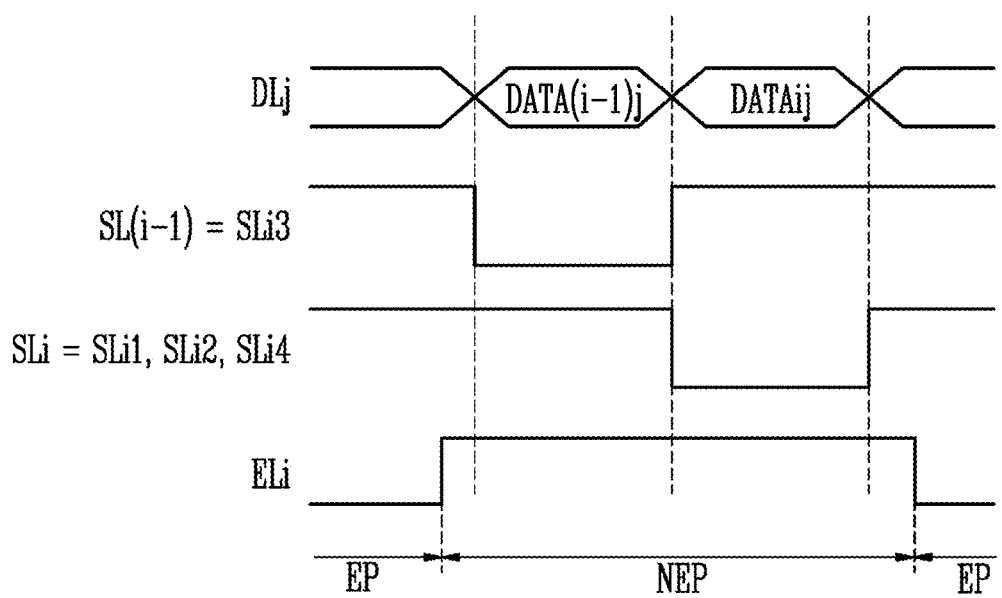

FIGS. 2 through 4 illustrate a display unit and a display driver according to one or more embodiments of the present disclosure.

Referring to FIG. 2, the display driver 210 may include a timing controller 11 and a data driver 12. The display unit 110 may include a scan driver 13, a pixel portion 14, and an emission driver 15. However, as described above, whether respective functional portions are to be integrated into one IC or into a plurality of ICs, or to be mounted on the display substrate 111 may be variously configured according to embodiments of the display device 1.

The timing controller 11 may receive grays (e.g., gray values or grayscale values) and timing signals for each frame period from a processor 230 (see FIG. 1). The timing signals may include a vertical synchronization signal, a horizontal synchronization signal, a data enable signal, and the like.

Each cycle of the vertical synchronization signal may correspond to a respective display frame period. Each cycle of the horizontal synchronization signal may correspond to a respective horizontal period. The grayscales may be supplied in units of horizontal line in each horizontal period in response to a pulse of an enable level of the data enable signal. The horizontal line may mean pixels connected to the same or substantially the same scan line and light emitting line (e.g., pixel row).

The timing controller 11 may render grays to correspond to the specifications of the display device 1. For example, the processor 9 may provide a red gray, a green gray, and a blue gray for each unit dot. For example, when the pixel portion 14 has an RGB stripe structure, a pixel may correspond to each gray one to one. In this case, rendering of grayscales may not be necessary. However, for example, when the pixel portion 14 has an RGBG structure (e.g., a PENTILE® structure, PENTILE® being a duly registered trademark of Samsung Display Co., Ltd.), because adjacent unit dots share a pixel, the pixel may not correspond to each gray one to one. In this case, rendering of the grayscales may be desired. The rendered or non-rendered grayscales may be provided to the data driver 12. In addition, the timing controller 11 may provide a data control signal to the data driver 12. In addition, the timing controller 11 may provide a scan control signal to the scan driver 13, and may provide a light emitting control signal to the emission driver 15.

The data driver 12 may generate a data voltage (e.g., data signals) to be provided to data lines (DL1, DL2, DL3, DL4, . . . , DLn) by using the grays and the data control signals received from the timing controller 11, where n may be an integer larger than zero.

The scan driver 13 may generate scan signals to be provided to scan lines (SL0, SL1, SL2, . . . , SLm) by using a scan control signal (e.g., a clock signal, a scan start signal, and/or the like) received from the timing controller 11, where m is an integer greater than zero. The scan driver 13 may sequentially supply scan signals having a turn-on level pulse to the scan lines SL0 to SLm. The scan driver 13 may include scan stages configured in a form of a shift register. The scan driver 13 may generate the scan signals through a method of sequentially transmitting a scan start signal, which is a pulse type of a turn-on level, to a next scan stage according to control of the clock signal.

The emission driver 15 may generate light emitting signals to be provided to light emitting lines (EL1, EL2, EL3, . . . , ELo) by using a light emitting control signal (e.g., a clock signal, a light emitting stop signal, and/or the like) received from the timing controller 11, where o is an integer larger than zero. The emission driver 15 may sequentially supply light emitting signals having a turn-off level pulse to the light emitting lines EL1 to ELo. The emission driver 15 may include light emitting stages configured in a form of a shift register. The emission driver 15 may generate light emitting signals by sequentially transmitting a light emitting stop signal having a form of a turn-off level pulse to a next light emitting stage depending on control of a clock signal. The pixel portion 14 includes the pixels. Each pixel PXij may be connected to a corresponding data line, scan line, and light emitting line. The pixels may include pixels that emit first color light, pixels that emit second color light, and pixels that emit third color light. The first color, the second color, and the third color may be different colors. For example, the first color may be one color of red, green, and blue, the second color may be one color of red, green, and blue excluding the first color, and the third color may be the remaining color of red, green, blue excluding the first and second colors. In addition, magenta, cyan, and yellow may be used instead of red, green, and blue as the first to third colors.

For example, one pixel group may include three pixels. The three pixels may be a red pixel, a green pixel, and a blue pixel, respectively. As another example, one pixel group may include four pixels. For example, the four pixels may be a red pixel, a green pixel (e.g., a first green pixel), a green pixel (e.g., a second green pixel), and a blue pixel, respectively. The four pixels may be disposed to form a quadrangular shape in two rows and two columns. The four pixels may be disposed in three columns, forming a diamond shape with one pixel in a first column, two pixels arranged in two rows in a second column, and one pixel in a third column. In this case, one pixel group refers to a basic unit in which the disposition shape of the same or substantially the same pixels is repeated along the column or row of the pixel portion 14.

FIG. 3 is a drawing for explaining a pixel according to some embodiments of the present disclosure.

Referring to FIG. 3, the pixel PXij includes transistors T1, T2, T3, T4, T5, T6, and T7, a storage capacitor Cst, and a light emitting element LD. Hereinafter, a circuit configured of a P-type transistor will be described as an example. However, a person of an ordinary skill in the art, by changing a polarity of a voltage applied to a gate terminal, may design a circuit configured of an N-type transistor. Similarly, a person of an ordinary skill in the art would be able to design a circuit configured of a combination of a P-type of transistor and an N-type of transistor. The P-type of transistor refers to a transistor in which an amount of current increases when a voltage difference between a gate electrode and a source electrode increases in a negative direction. The N-type of transistor refers to a transistor in which an amount of current increases when a voltage difference between a gate electrode and a source electrode increases in a positive direction. The transistor may have various kinds such as a thin film transistor (TFT), a field effect transistor (FET), and a bipolar junction transistor (BJT).

In the first transistor T1, a gate electrode may be connected to a first node N1, a first electrode may be connected to a second node N2, and a second electrode may be connected to a third node N3. The first transistor T1 may be referred to as a driving transistor.

In the second transistor T2, a gate electrode may be connected to a scan line SLi1, a first electrode may be connected to a data line DLj, and a second electrode may be connected to the second node N2. The second transistor T2 may be referred to as a scan transistor.

In the third transistor T3, a gate electrode may be connected to a scan line SLi2, a first electrode may be connected to the first node N1, and a second electrode may be connected to the third node N3. The third transistor T3 may be referred to as a diode-connection transistor.

In the fourth transistor T4, a gate electrode may be connected to a scan line SLi3, a first electrode may be connected to the first node N1, and a second electrode may be connected to an initialization line INTL. The fourth transistor T4 may be referred to as a gate initialization transistor.

In the fifth transistor T5, a gate electrode may be connected to an i-th light emitting line ELi, a first electrode may be connected to a first power line ELVDDL, and a second electrode may be connected to the second node N2. The fifth transistor T5 may be referred to as a light emitting transistor. In some embodiments, the gate electrode of the fifth transistor T5 may be connected to a light emitting line different from a light emitting line connected to a gate electrode of the sixth transistor T6.

In the sixth transistor T6, the gate electrode may be connected to the i-th light emitting line ELi, a first electrode may be connected to the third node N3, and a second electrode may be connected to an anode of the light emitting element LD. The sixth transistor T6 may be referred to as a light emitting transistor. In some embodiments, the gate electrode of the sixth transistor T6 may be connected to a light emitting line different from a light emitting line connected to the gate electrode of the fifth transistor T5.

In the seventh transistor T7, a gate electrode may be connected to a scan line SLi4, a first electrode may be connected to the initialization line INTL, and a second electrode may be connected to the anode of the light emitting element LD. The seventh transistor T7 may be referred to as an anode initialization transistor. In some embodiments, the initialization line INTL to which the first electrode of the seventh transistor T7 is connected is a line different from the initialization line INTL to which the second electrode of the fourth transistor T4 is connected, and the seventh transistor T7 and the fourth transistor T4 may receive different initialization voltages.

A first electrode of the storage capacitor Cst may be connected to the first power line ELVDDL, and a second electrode thereof may be connected to the first node N1.

The anode of the light emitting element LD may be connected to the second electrode of the sixth transistor T6, and a cathode thereof may be connected to a second power line ELVSSL. The light emitting element LD may be a light emitting diode. The light emitting element LD may include an organic light emitting diode, an inorganic light emitting diode, and/or a quantum dot/well light emitting diode. The light emitting element LD may emit light in one of the first color, the second color, and the third color. In addition, in the some embodiments, only one light emitting element LD is provided in each pixel, but in some embodiments, a plurality of light emitting elements may be provided in each pixel. In this case, the plurality of light emitting elements may be connected in series, in parallel, or in series/parallel.

A first power source voltage may be applied to the first power line ELVDDL, a second power source voltage may be applied to the second power line ELVSSL, and an initialization voltage may be applied to the initialization line INTL. For example, the first power source voltage may be larger than the second power source voltage. For example, the initialization voltage may be substantially equal to or larger than the second power source voltage. For example, the initialization voltage may correspond to a smallest one of data voltages that may be provided. In another example, the initialization voltage may be smaller than the data voltages that may be provided.

FIG. 4 is a drawing for explaining an exemplary driving method of the pixel of FIG. 3.

Hereinafter, for better understanding and ease of description, it is assumed that the scan lines SLi1, SLi2, and SLi4 are i-th scan lines SLi, and the scan line SLi3 is an (i−1)-th scan line SL(i-1). However, the scan lines SLi1, SLi2, SLi3, and SLi4 may have various connection relationships according to embodiments. For example, the scan line SLi4 may be the (i-1)-th scan line or the (i+1)-th scan line.

First, a light emitting signal having a turn-off level (logic high level, logic high level) is applied to the i-th light emitting line ELi, a data voltage DATA(i-1)j for an (i-1)-th pixel is applied to the data line DLj, and a scan signal having a turn-on level (logic low level) is applied to the scan line SLi3. The high/low logic level may vary depending on whether the transistor is P-type or N-type.

In this case, since the scan signal having a turn-off level is applied to the scan lines SLi1 and SLi2, the second transistor T2 is in a turn-off state, and the data voltage DATA(i-1)j for the (i-1)-th pixel is not inputted to the pixel PXij.

In this case, since the fourth transistor T4 is in a turned-on state, the first node N1 is connected to the initialization line INTL, so that a voltage of the first node N1 is initialized. Since the light emitting signal having a turn-off level is applied to the light emitting line ELi, the transistors T5 and T6 are in a turn-off state, and unnecessary light emitting from the light emitting element LD according to the initialization voltage application process is prevented.

Next, the data voltage DATAij for the i-th pixel PXij is applied to the data line DLj, and the scan signal having a turn-on level is applied to the scan lines SLi1 and SLi2. Accordingly, the transistors T2, T1, and T3 are turned on, and thus the data line DLj and the first node N1 are electrically connected. Accordingly, a compensation voltage obtained by subtracting a threshold voltage of the first transistor T1 from the data voltage DATAij is applied to the second electrode (that is, the first node N1) of the storage capacitor Cst, and the storage capacitor Cst maintains a voltage corresponding to a difference between the first power source voltage and the compensation voltage. This period may be referred to as a threshold voltage compensation period or data writing period.

In addition, when the scan line SLi4 is the i-th scan line, the seventh transistor T7 is turned on, so the anode of the light emitting element LD and the initialization line INTL are connected, and the light emitting element LD is initialized with an amount of charge corresponding to a voltage difference between the initialization voltage and the second power source voltage.

Thereafter, as the light emitting signal having a turn-on level is applied to the i-th light emitting line ELi, the transistors T5 and T6 may be turned on. Accordingly, a driving current path connecting the first power line ELVDDL, the fifth transistor T5, the first transistor T1, the sixth transistor T6, the light emitting element LD, and the second power line ELVSSL is formed.

An amount of driving current flowing through the first and second electrodes of the first transistor T1 is adjusted according to a voltage maintained in the storage capacitor Cst. The light emitting element LD emits light with a luminance corresponding to the amount of driving current. The light emitting element LD emits light until a light emitting signal of a turn-off level is applied to the light emitting line ELi.

When the light emitting signal has a turned-on level, pixels receiving the corresponding light emitting signal may be in a display state. Accordingly, a period in which the light emitting signal has the turned-on level may be referred to as a light emitting period EP (or a light emitting permissive period). In addition, when the light emitting signal has a turned-off level, pixels receiving the corresponding light emitting signal may be in a non-display state. Accordingly, a period in which the light emitting signal has the turned-off level may be referred to as a non-light emitting period NEP (or a light emitting non-permissive period).

The non-light emitting period NEP described in FIG. 4 is to prevent the pixel PXij from emitting light with undesired luminance during the initialization period and the data writing period.

While data written in the pixel PXij is maintained (e.g., one frame period), one or more non-light emitting periods NEP may be additionally provided. This may be to suitably express a low gray level by reducing the light emitting period EP of the pixel PXij, or to smoothly blur the motion of an image.

Figure 5:
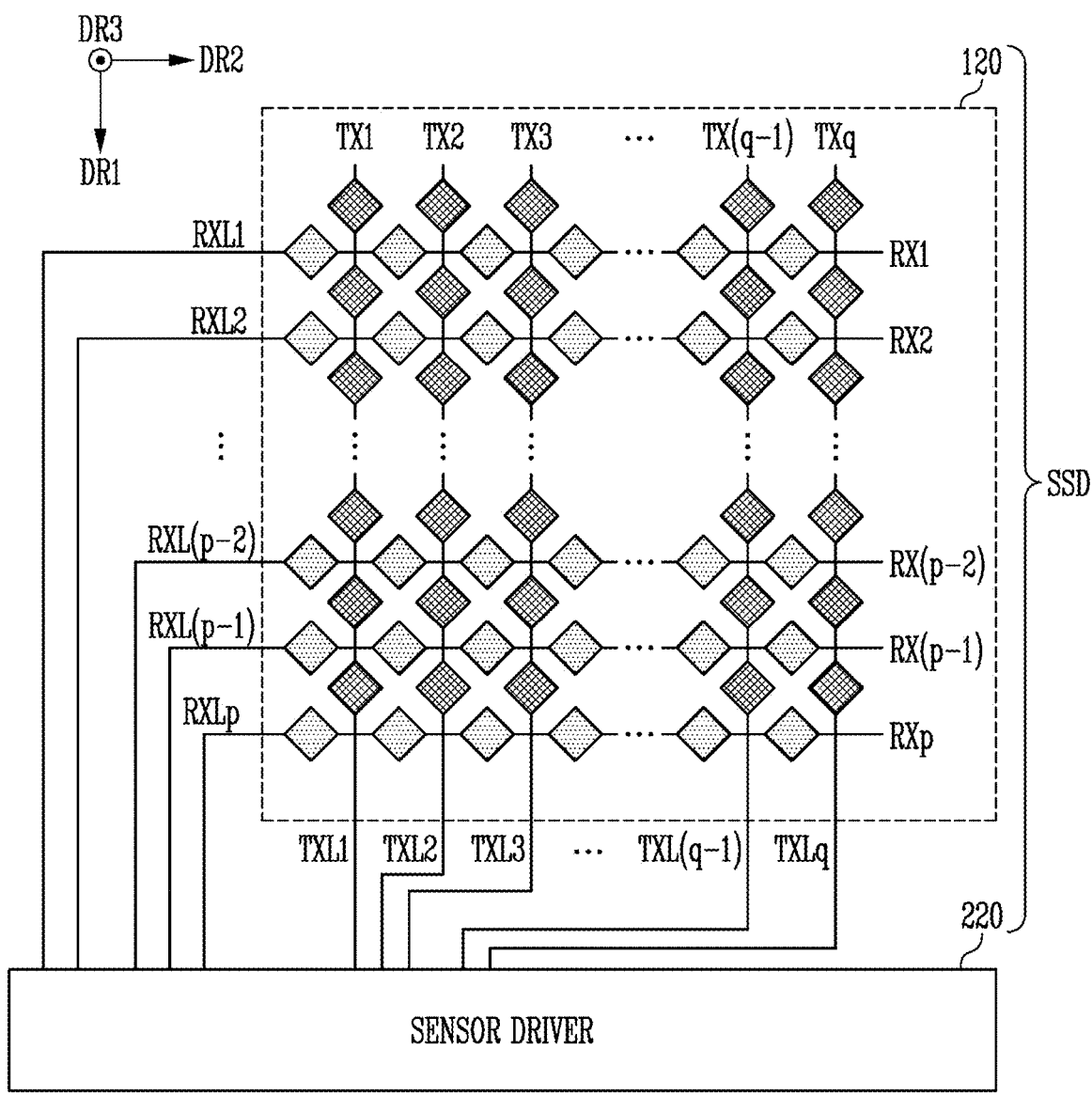
FIG. 5 illustrates a sensor device according to an embodiment of the present disclosure.

FIG. 5 is a drawing for explaining a sensor device according to some embodiments of the present disclosure.

Referring to FIG. 5, a sensor device SSD according to some embodiments of the present disclosure may include the sensor unit 120 and the sensor driver 220. The sensor device SSD may be included inside the display device 1.

The sensor unit 120 may include first sensors (TX1, TX2, TX3, . . . , TX(q-1), TXq) and second sensors (RX1, RX2, . . . , RX(p-2), RX(p-1), RXp). Each of p and q may be an integer greater than 0. The first sensors TX1 to TXq may extend in the first direction DR1, and may be spaced apart from each other in the second direction DR2 to be arranged parallel to each other. The second sensors RX1 to RXp may extend in the second direction DR2, and may be spaced apart from each other in the first direction DR1 to be arranged parallel to each other. The second sensors RX1 to RXp may cross the first sensors TX1 to TXq. The second sensors RX1 to RXp may form mutual capacitance with the first sensors TX1 to TXq. The sensor driver 220 may detect changes in capacitances to determine whether to input a user's touch.

The sensor driver 220 may supply driving signals to the first sensors TX1 to TXq during the touch sensing period. The sensor driver 220 may be connected to the first sensors TX1 to TXq through the first sensor lines (TXL1, TXL2, TXL3, . . . , TXL (q-1), TXLq).

The sensor driver 220 may receive sensing signals from the second sensors RX1 to RXp during the touch sensing period. The sensor driver 220 may be connected to the second sensors RX1 to RXp through the second sensor lines (RXL1, RXL2, . . . , RXL(p-2), RXL(p-1), RXLp).

Figure 6:
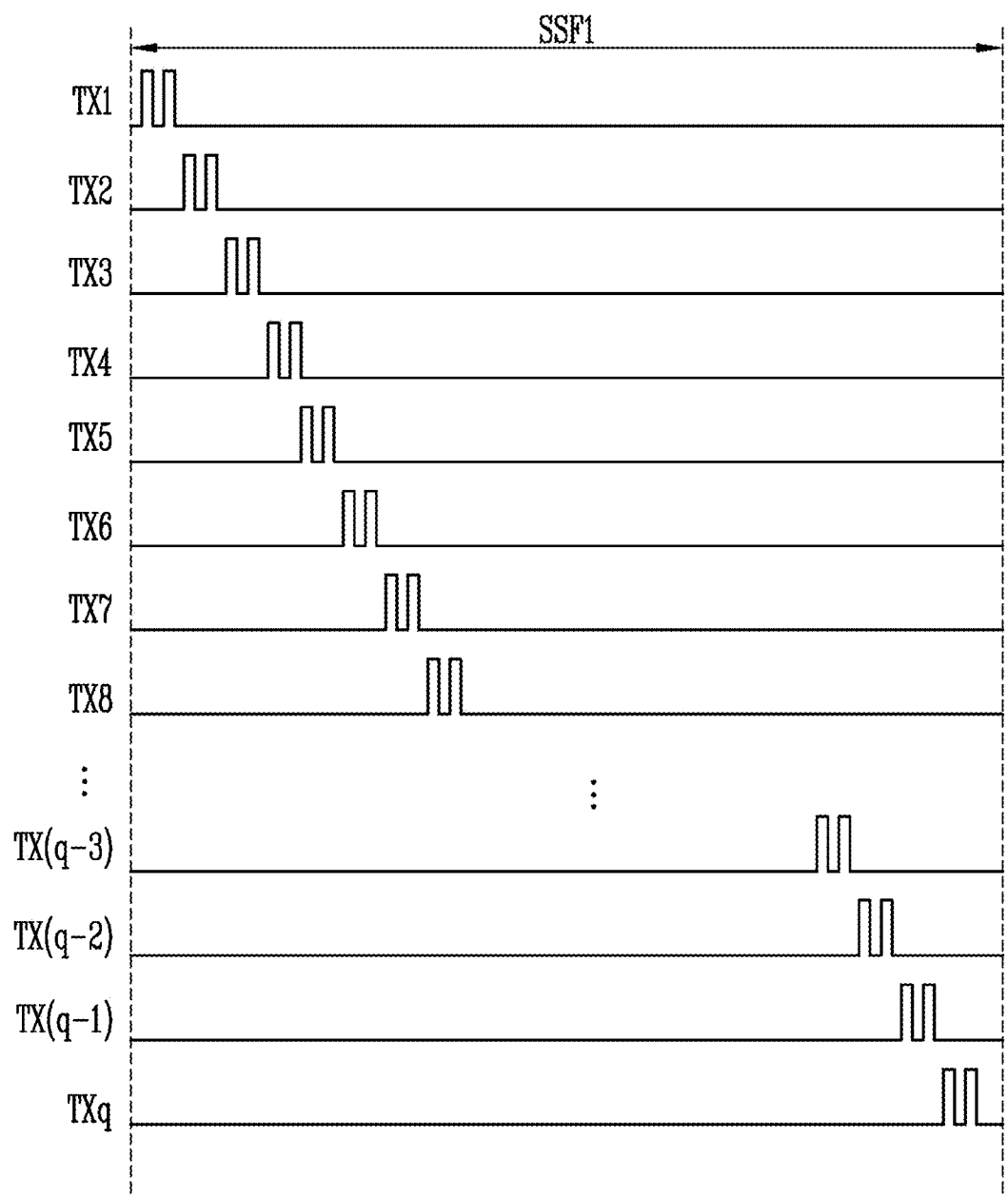
FIG. 6 illustrates a timing diagram of a driving method of a sensor device according to an embodiment of the present disclosure.

FIG. 6 is a drawing for explaining a driving method of a sensor device according to some embodiments of the present disclosure.

Referring to FIG. 6, driving signals applied to the first sensors (TX1, TX2, TX3, TX4, TX5, TX6, TX7, TX8, . . . , TX(q-3), TX(q-2), TX(q-1), TXq) during a touch sensing period SSF1 are illustrated.

The sensor driver 220 may apply the driving signals to the first sensors TX1 to TXq in a time-division manner. Timings at which the driving signals are respectively applied to the first sensors TX1 to TXq may not overlap with each other. For example, the sensor driver 220 may sequentially apply the driving signals to the first sensors TX1 to TXq. Each of the driving signals may be a voltage signal alternating between a high level and a low level.

In another example, the sensor driver 220 may apply a plurality of driving signals for a plurality of first sensors during the same or substantially the same period. In this case, it may be said that the plurality of driving signals applied during the same or substantially the same period belong to one driving group. For example, when two driving signals belong to one driving group, the driving signals may be applied to the first sensors TX1 and TX2 in a time-overlapping manner during a first period. During a second period after the first period, the driving signals may be applied to the first sensors TX3 and TX4 in a time-overlapping manner. In some embodiments, three driving signals may belong to one driving group. In some embodiments, four driving signals may belong to one driving group (see FIG. 21 and FIG. 22).

The sensor driver 220 may receive sensing signals through the second sensors RX1 to RXp for each driving signal. When a magnitude of the sensing signal detected by a specific second sensor is different from other sensing signals, it may be determined that a user's touch has occurred at a crossing point between the first sensor to which the driving signal is applied and the second sensor to which the sensing signal is detected. For example, when a user's touch occurs, the capacitance between the first sensor and the second sensor at the corresponding point may be reduced, so that the magnitude of the sensing signal received from the second sensor may be reduced.

Figure 7:
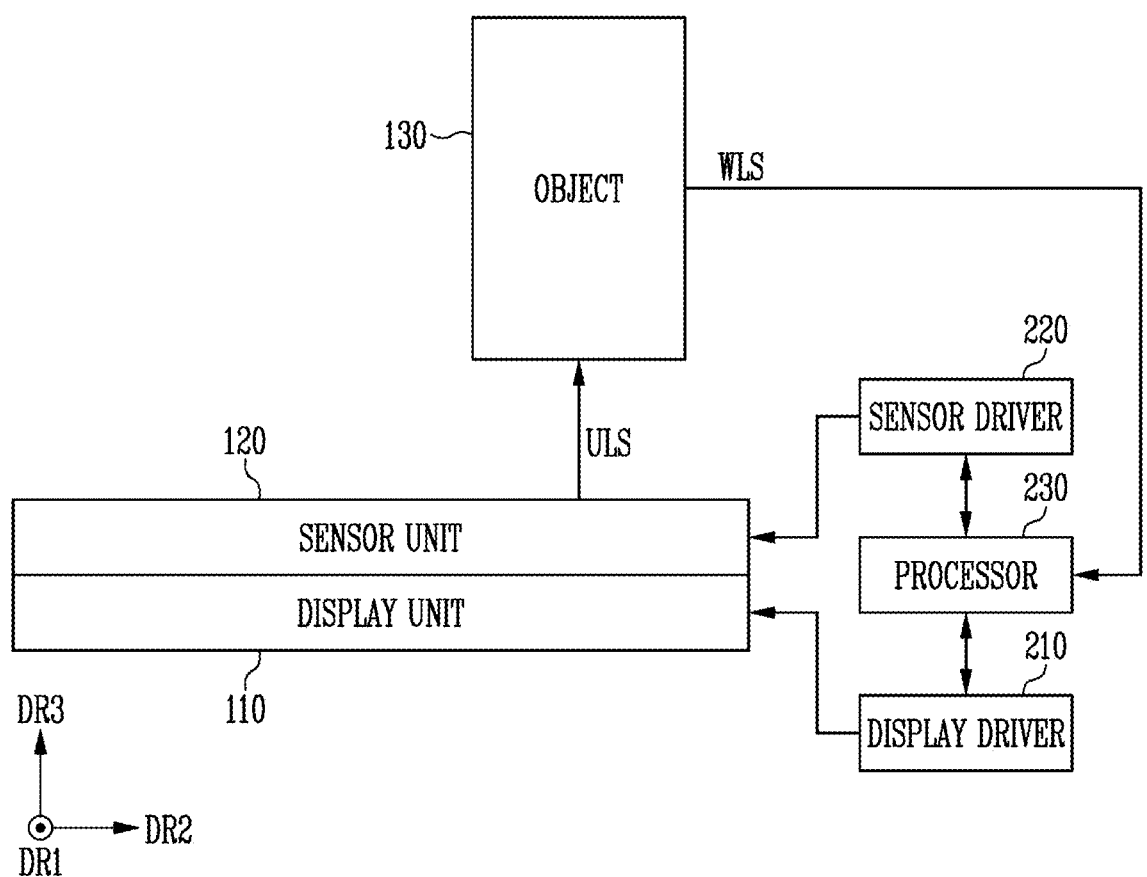
FIG. 7 illustrates a relationship between a display device and an object according to an embodiment of the present disclosure.

FIG. 7 is a drawing for explaining a relationship between a display device and an object according to some embodiments of the present disclosure.

Referring to FIG. 7, an object 130 may be positioned on the sensor unit 120. The sensor driver 220 may apply the first driving signals to at least some of the first sensors TX1 to TXq and the second driving signals to at least some of the second sensors RX1 to RXp, during an object sensing period different from the touch sensing period. Uplink signals ULS may include the first driving signals and the second driving signals.

The object 130 may receive the uplink signals ULS from the sensor unit 120. For example, the receiving electrode of the object 130 may form capacitances with the adjacent first sensors TX1 to TXq and the adjacent second sensors RX1 to RXp. The closer the sensor is to the object 130, the greater the capacitance it may form with the receiving electrode of the object 130. For example, the object 130 may receive the first and second driving signals whose magnitudes are proportional to the magnitude of each capacitance.

The object 130 may calculate the position of the object 130 based on the sensor unit 120 by decoding the received uplink signals ULS using an internal computing device. For example, the internal computing device of the object 130 may obtain coordinates for the second direction DR2 by decoding the first driving signals, and may obtain coordinates for the first direction DR1 by decoding the second driving signals.

The object 130 may provide the computed position to the processor 230 through wireless communication WLS. The wireless communication WLS may be implemented in various suitable generally available/used ways, such as Bluetooth, Bluetooth low energy (BLE), WiFi direct, and infrared data association (IrDA). Accordingly, the display device 1 may know the position of the object 130 and use it as input information.

The object 130 may be implemented in various forms, such as an active pen, a figure, a toy, a chess piece, and/or a card.

Figure 8:
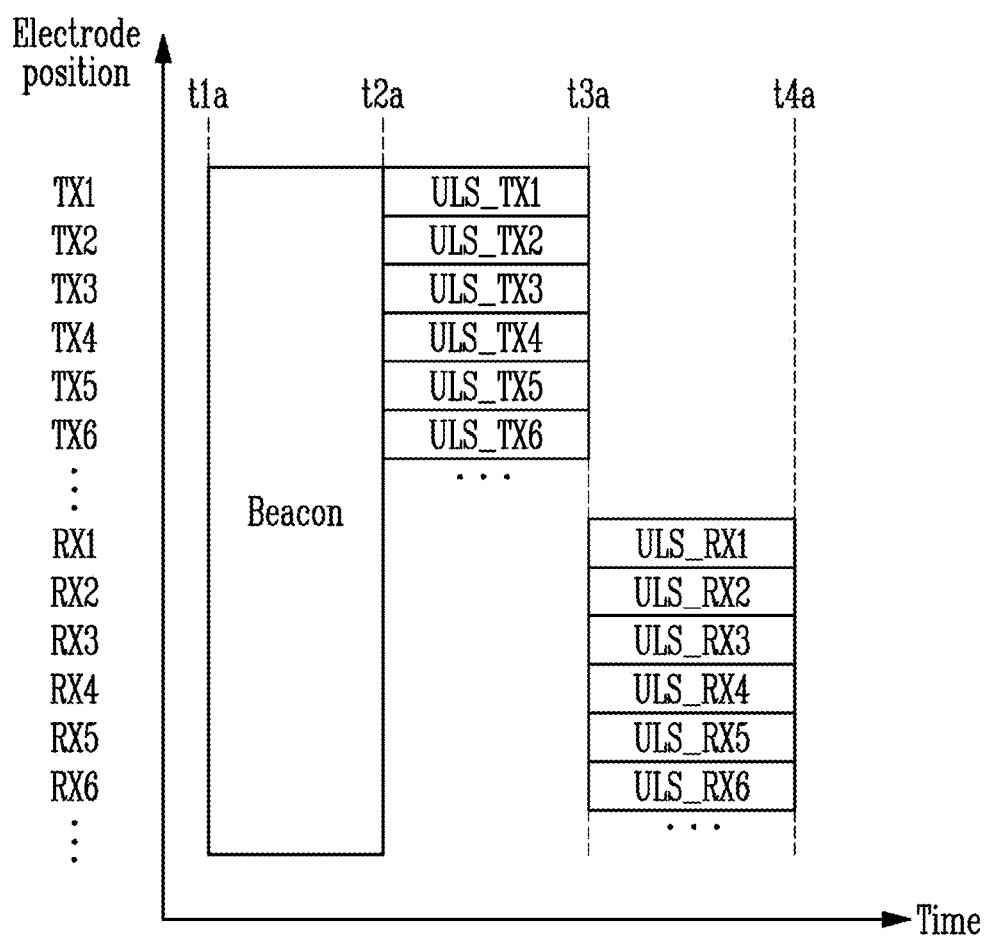
FIGS. 8-10 illustrate first driving signals and second driving signals of a sensor device.
Figure 9:
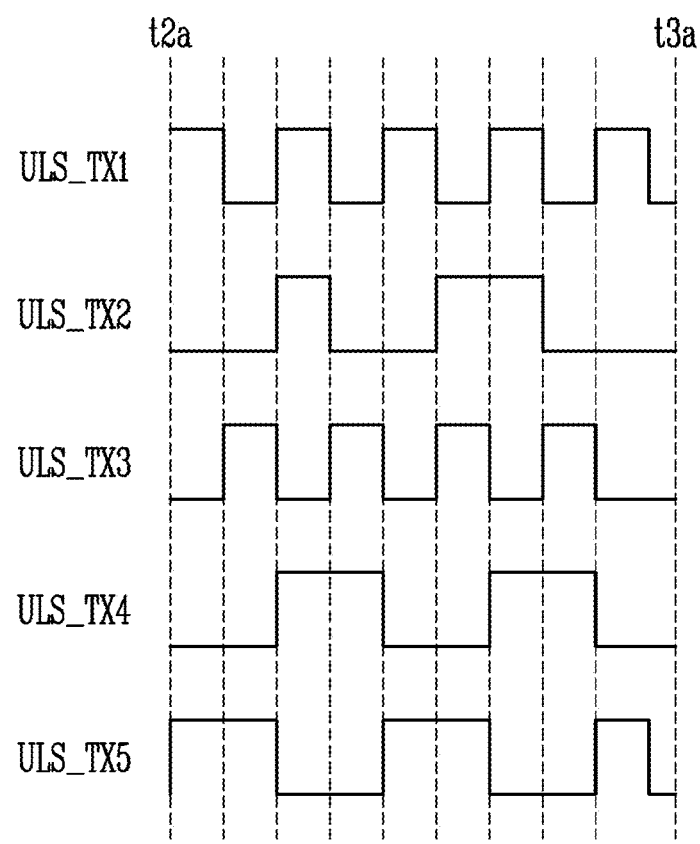
Figure 10:
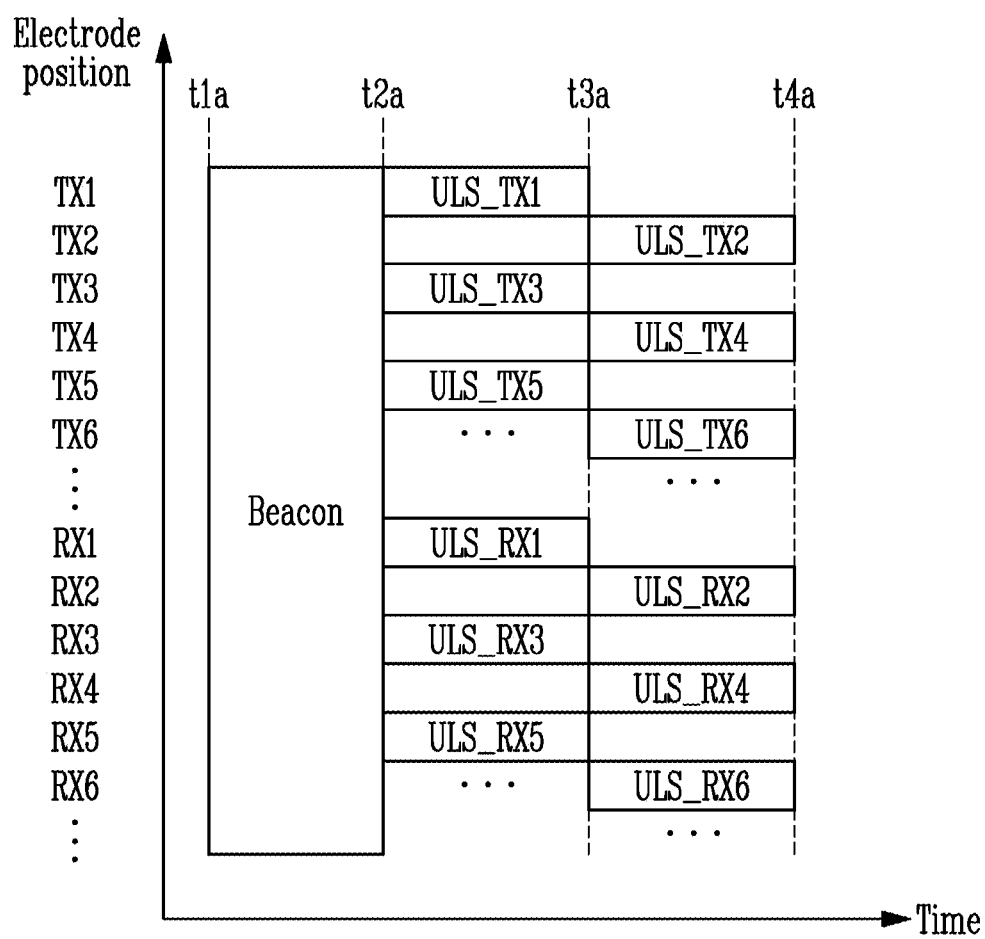

FIG. 8 to FIG. 10 are drawings for explaining first driving signals and second driving signals of a sensor device.

Referring to FIG. 8, the display device 1 may transmit a beacon signal at a starting time point t1a of the object sensing period. The beacon signal is a signal periodically transmitted from the display device 1, and may be a signal notifying the object 130 of the presence of the display device 1. The beacon signal may include information for synchronizing with the display device 1, such as information on the display device 1 and a communication protocol.

During the period from t2a to t3a, the sensor driver 220 may apply the first driving signals (ULS_TX1 to ULS_TX6, . . . ) to the corresponding first sensors (TX1 to TX6, . . . ). For example, the sensor driver 220 may substantially simultaneously apply the first driving signals (ULS_TX1 to ULS_TX6, . . . ) encoded to correspond to a specific code to the corresponding first sensors (TX1 to TX6, . . . ).

Referring to FIG. 9, some example first driving signals (ULS_TX1 to ULS_TX5) are shown. For example, the first driving signal ULS_TX1 applied to the first sensor TX1 may be an analog voltage signal including voltage pulses corresponding to the code [1 −1 1 −1 1 −1 1 −1 1]. The first driving signal ULS_TX2 applied to the first sensor TX2 may be an analog voltage signal including voltage pulses corresponding to the code [−1 −1 1 −1 −1 1 1 −1 −1]. The first driving signal ULS_TX3 applied to the first sensor TX3 may be an analog voltage signal including voltage pulses corresponding to the code [−1 1 −1 1 −1 1 −1 1 −1]. The first driving signal ULS_TX4 applied to the first sensor TX4 may be an analog voltage signal including voltage pulses corresponding to the code [−1 −1 1 1 −1 −1 1 1 −1]. The first driving signal ULS_TX5 applied to the first sensor TX5 may be an analog voltage signal including voltage pulses corresponding to the code [1 1 −1 −1 1 1 −1 −1 1].

In some embodiments of FIG. 9, the first driving signal is illustrated to have a high level voltage when code is 1 and to have a low level voltage when code is −1. However, the first driving signal may have a plurality of voltage pulses when the code is 1, and to have a plurality of voltage pulses with opposite phases when the code is −1. That is, FIG. 9 is only an example, and the encoding method of the present disclosure may not be limited.

Referring back to FIG. 8, during the period from t3a to t4a, the sensor driver 220 may apply the second driving signals (ULS_RX1 to ULS_RX6, . . . ) to the corresponding second sensors (RX1 to RX6, . . . ). For example, the sensor driver 220 may substantially simultaneously apply the second driving signals (ULS_RX1 to ULS_RX6, . . . ) encoded to correspond to a specific code to the corresponding second sensors (RX1 to RX6, . . . ). Since the encoding method of the second driving signals (ULS_RX1 to ULS_RX6, . . . ) may be similar to the encoding method of the first driving signals (ULS_TX1 to ULS_TX6, . . . ) a redundant description will be omitted.

Referring to FIG. 10, during the period from t2a to t3a, the sensor driver 220 may apply the first driving signals (ULS_TX1, ULS_TX3, ULS_TX5, . . . ) to the corresponding first sensors (TX1, TX3, TX5, . . . ), and the second driving signals (ULS_RX1, ULS_RX3, ULS_RX5, . . . ) to the corresponding second sensors (RX1, RX3, RX5, . . . ). For example, the sensor driver 220 may substantially simultaneously apply the first driving signals (ULS_TX1, ULS_TX3, ULS_TX5, . . . ) and the second driving signals (ULS_RX1, ULS_RX3, ULS_RX5, . . . ), which are encoded to correspond to a specific code, to the first sensors (TX1, TX3, TX5, . . . ) and the second sensors (RX1, RX3, RX5, . . . ). For example, during the period from t2a to t3a, the sensor driver 220 may apply the driving signals to the odd-numbered first sensors (TX1, TX3, TX5, . . . ) and the odd-numbered second sensors (RX1, RX3, RX5, . . . ).

During the period from t3a to t4a, the sensor driver 220 may apply the first driving signals (ULS_TX2, ULS_TX4, ULS_TX6, . . . ) to the corresponding first sensors (TX2, TX4, TX6, . . . ), and the second driving signals (ULS_RX2, ULS_RX4, ULS_RX6, . . . ) to the corresponding second sensors (RX2, RX4, RX6, . . . ). For example, the sensor driver 220 may substantially simultaneously apply the first driving signals (ULS_TX2, ULS_TX4, ULS_TX6, . . . ) and the second driving signals (ULS_RX2, ULS_RX4, ULS_RX6, . . . ), which are encoded to correspond to a specific code, to the first sensors (TX2, TX4, TX6, . . . ) and the second sensors (RX2, RX4, RX6, . . . ). For example, during the period from t3a to t4a, the sensor driver 220 may apply the driving signals to the even-numbered first sensors (TX2, TX4, TX6, . . . ) and the even-numbered second sensors (RX2, RX4, RX6, . . . ).

In addition, the sensor driver 220 may apply the first driving signals and the second driving signals to the first sensors and the second sensors in various suitable methods and timings.

Figure 11:
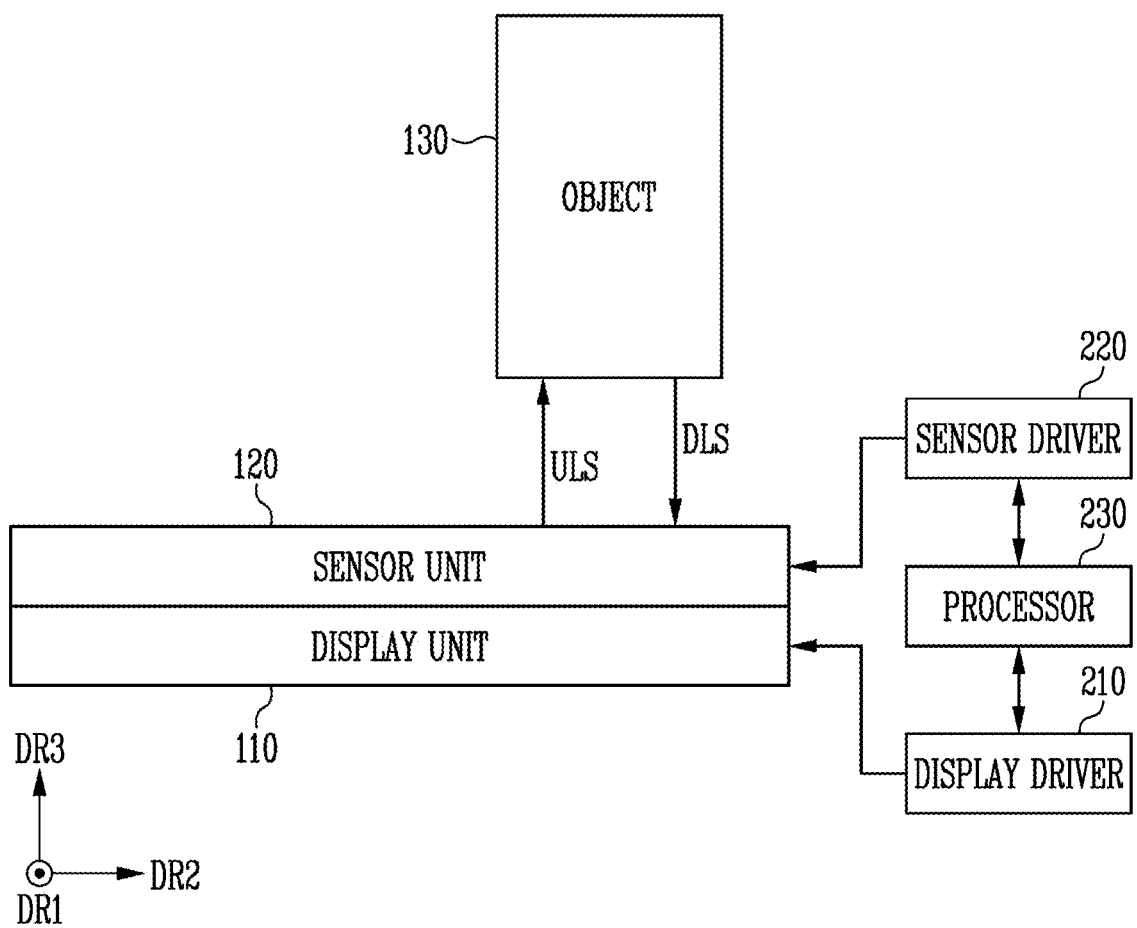
FIG. 11 and FIG. 12 illustrate a relationship between a display device and an object according to one or more embodiments of the present disclosure.
Figure 12:
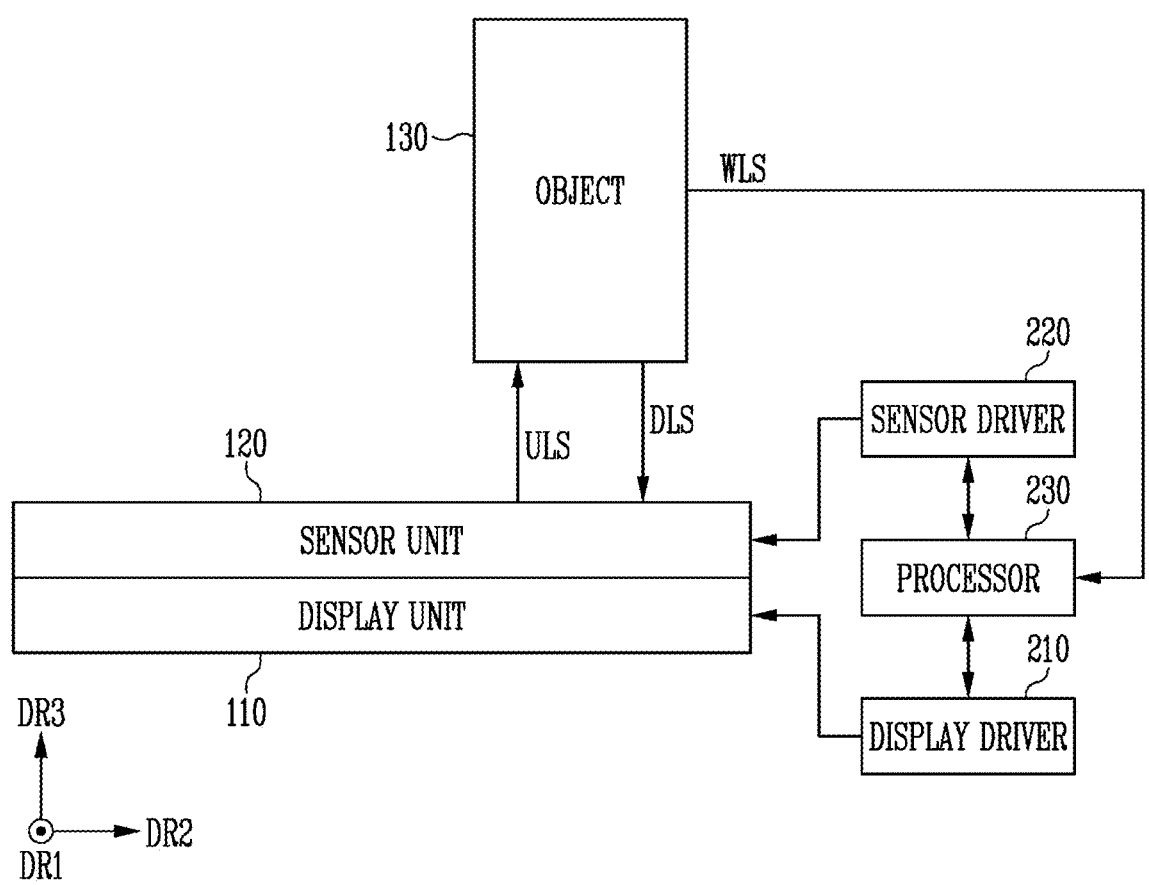

FIG. 11 and FIG. 12 are drawings for explaining a relationship between a display device and an object according to some embodiments of the present disclosure.

Referring to some embodiments of FIG. 11, the object 130 may calculate its own position and provide the calculated position to the sensor unit 120 through a downlink signal DLS. In this case, at least some of the first sensors TX1 to TXq and the second sensors RX1 to RXp may receive the downlink signal DLS. By decoding the received downlink signal DLS, the display device 1 may confirm the position of the object 130.

Referring to some embodiments of FIG. 12, the object 130 may calculate its own position, and may provide the calculated position and other information (pressure information, slope information, and the like) to the display device 1 through the downlink signal DLS and the wireless communication WLS. Information transmitted to the display device 1 through each communication method may vary for each embodiment.

Figure 13:
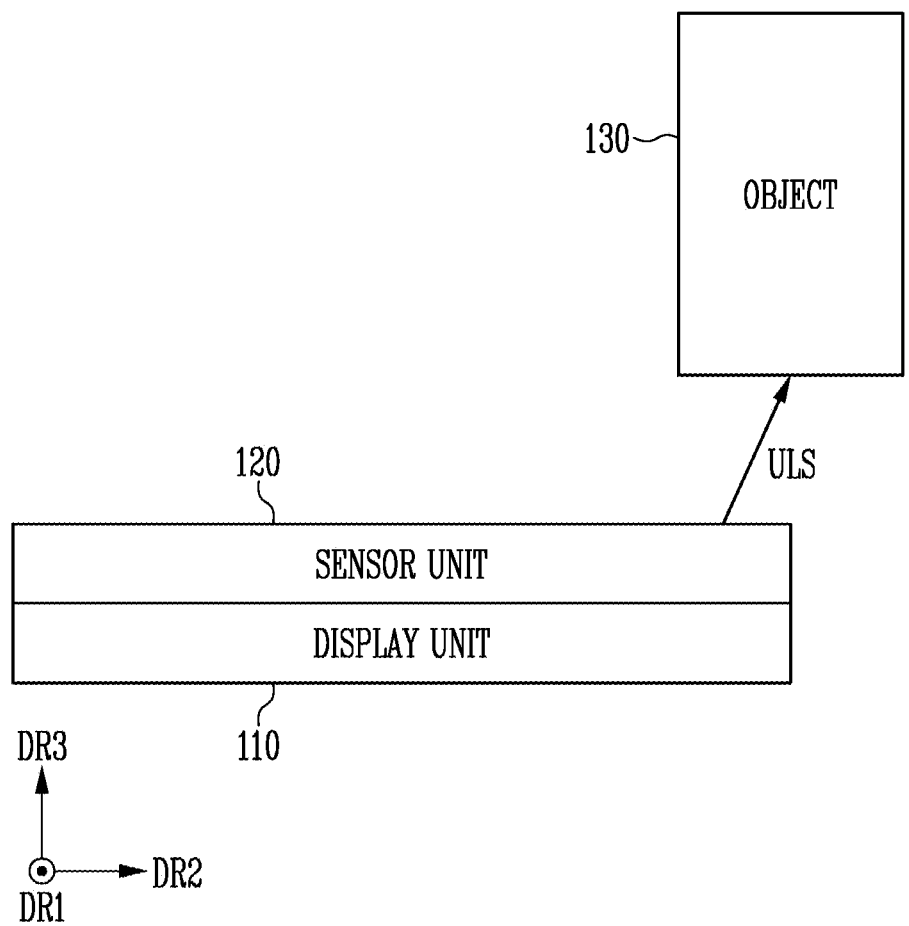
FIG. 13 illustrates a case in which an object is positioned in an edge area of a sensor unit.

FIG. 13 is a drawing for explaining a case in which an object is positioned in an edge area of a sensor unit.

When the object 130 is positioned in an edge area or outside of the display device 1, the object 130 may receive the uplink signal ULS from a relatively small number of sensors. Accordingly, it may not be easy to determine the position of the object 130.

Aspects of the present disclosure relating to determining the position of an object positioned in an edge area of outside of the display device will be presented with reference to FIG. 14 to FIG. 22.

During the object sensing period, the first driving signals (ULS_TX1a, ULS_TX2a, ULS_TX8a, ULS_TX9a) applied to the first sensors (TX1, TX2, TX8, TX9) disposed at the edge of the sensor unit 120 may have a higher signal-to-noise ratio (SNR) than the first driving signals (ULS_TX3a, ULS_TX4a, ULS_TX5a, ULS_TX6a, ULS_TX7a) applied to the first sensors (TX3, TX4, TX5, TX6, TX7) disposed at the central portion of the sensor unit 120. For this purpose, during the object sensing period, the first driving signals (ULS_TX1a, ULS_TX2a, ULS_TX8a, ULS_TX9a) applied to the first sensors (TX1, TX2, TX8, TX9) disposed at the edge of the sensor unit 120 may be different from the first driving signals (ULS_TX3a, ULS_TX4a, ULS_TX5a, ULS_TX6a, ULS_TX7a) applied to the first sensors (TX3, TX4, TX5, TX6, TX7) disposed at the central portion of the sensor unit 120, in at least one of voltage, frequency, phase, and/or code.

Accordingly, even if the object 130 is positioned in an edge area or outside of the display device 1 in the second direction DR2, the position of the object 130 in the second direction DR2 may be determined.

During the object sensing period, the second driving signals (ULS_RX1a, ULS_RX2a, ULS_RX8a, ULS_RX9a) applied to the second sensors (RX1, RX2, RX8, RX9) disposed at the edge of the sensor unit 120 may have a higher signal-to-noise ratio (SNR) than the second driving signals (ULS_RX3a, ULS_RX4a, ULS_RX5a, ULS_RX6a, ULS_RX7a) applied to the second sensors (RX3, RX4, RX5, RX6, RX7) disposed at the central portion of the sensor unit 120. For this purpose, during the object sensing period, the second driving signals (ULS_RX1a, ULS_RX2a, ULS_RX8a, ULS_RX9a) applied to the second sensors (RX1, RX2, RX8, RX9) disposed at the edge of the sensor unit 120 may be different from the second driving signals (ULS_RX3a, ULS_RX4a, ULS_RX5a, ULS_RX6a, ULS_RX7a) applied to the second sensors (RX3, RX4, RX5, RX6, RX7) disposed at the central portion of the sensor unit 120, in at least one of voltage, frequency, phase, and/or code.

Accordingly, even if the object 130 is positioned in an edge area or outside of the display device 1 in the first direction DR1, the position of the object 130 in the first direction DR1 may be determined.

Figure 14:
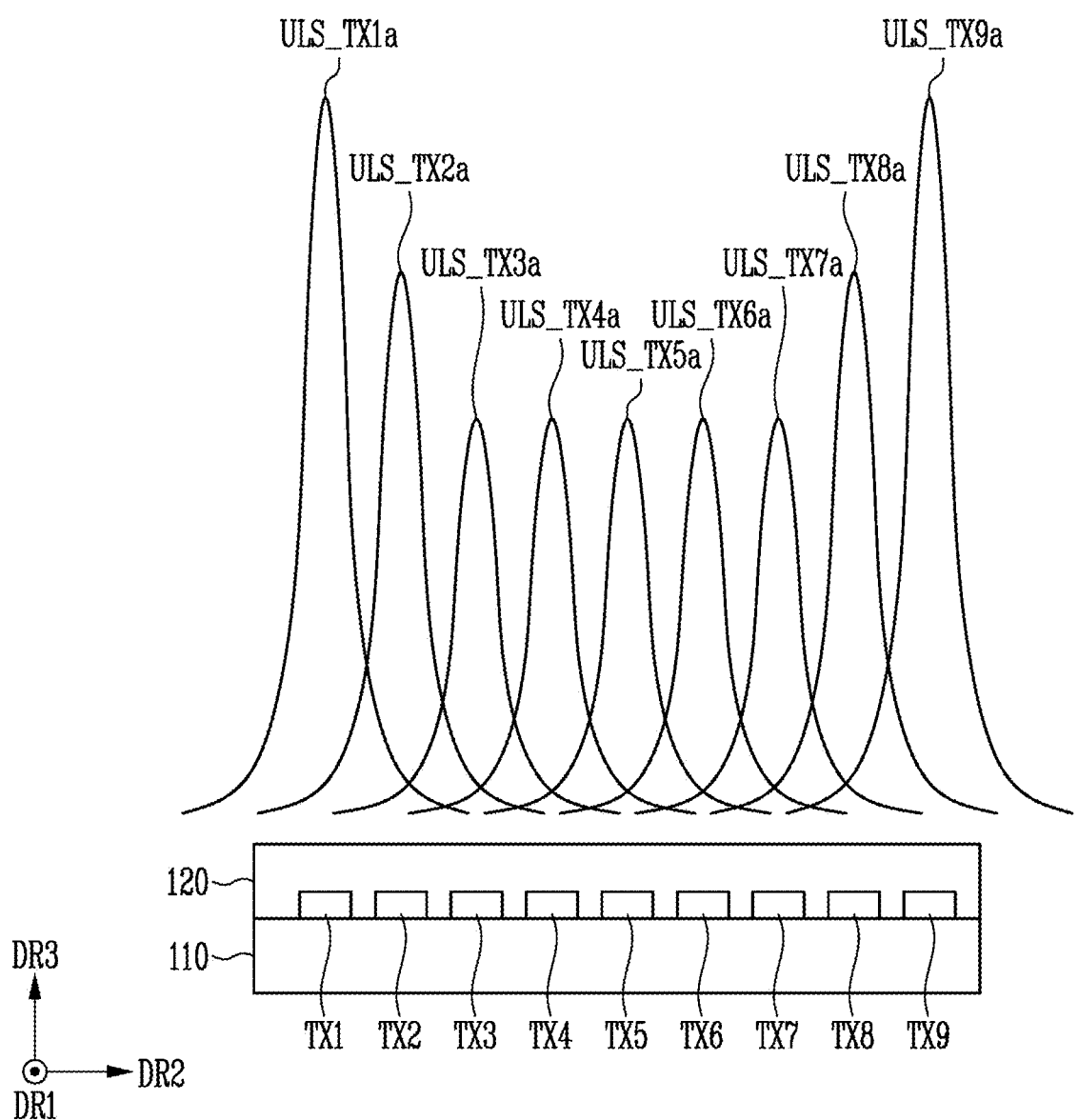
FIG. 14 and FIG. 15 illustrate first and second driving signals and voltage levels, according to one or more embodiments of the present disclosure.
Figure 15:
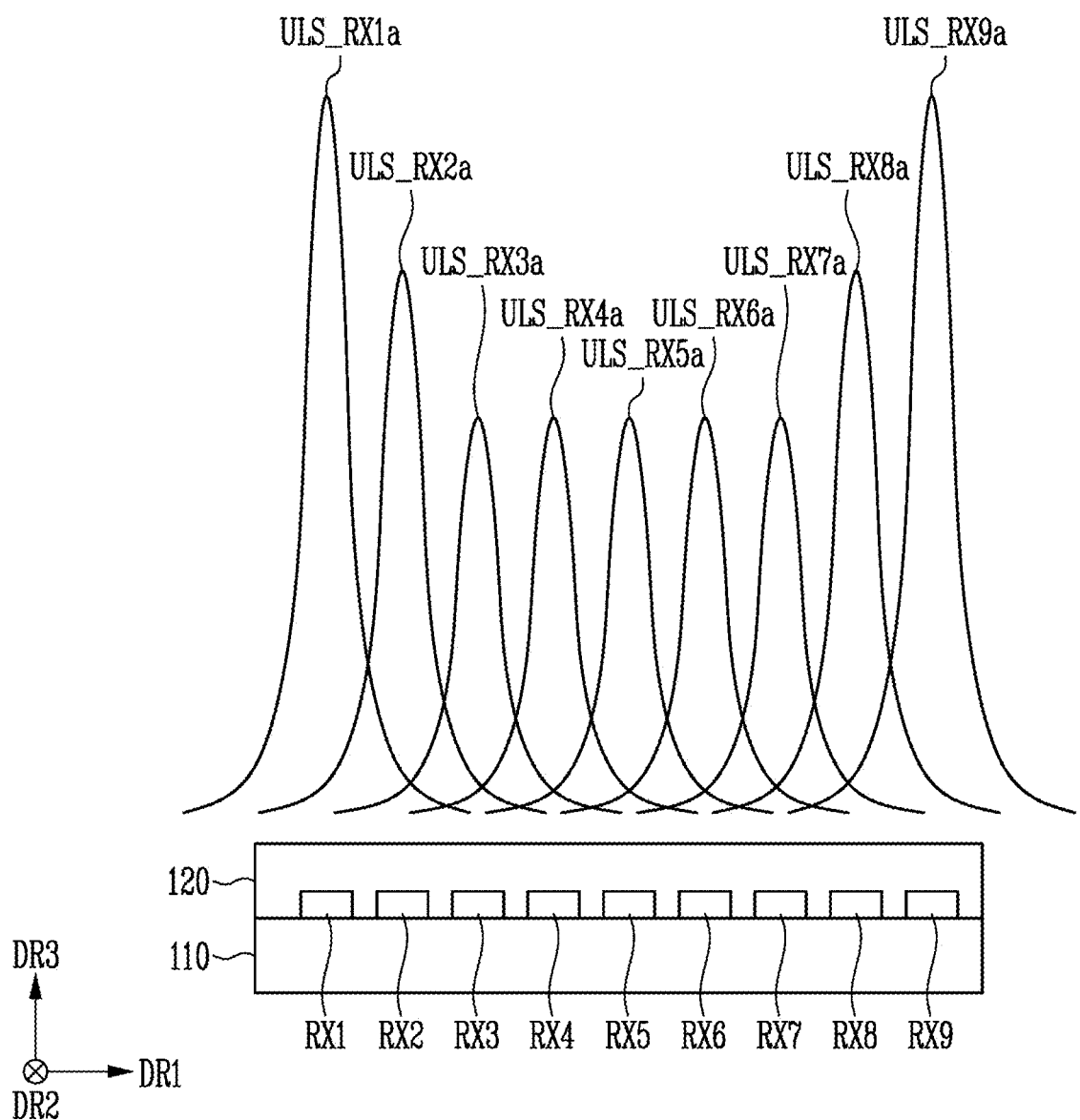

FIG. 14 and FIG. 15 are drawings for explaining first and second driving signals whose voltage levels are set, according to some embodiments of the present disclosure.

Referring to FIG. 14, during the object sensing period, the voltage levels of the first driving signals (ULS_TX1a, ULS_TX2a, ULS_TX8a, ULS_TX9a) applied to the first sensors (TX1, TX2, TX8, TX9) disposed at the edge of the sensor unit 120 may be greater than the voltage levels of the first driving signals (ULS_TX3a, ULS_TX4a, ULS_TX5a, ULS_TX6a, ULS_TX7a) applied to the first sensors (TX3, TX4, TX5, TX6, TX7) disposed at the central portion of the sensor unit 120. In FIG. 14, the length of the first driving signals (ULS_TX1a to ULS_TX9a) in the third direction DR3 indicates the voltage level. For example, the voltage level of the first driving signal ULS_TX1a applied to the first sensor TX1 may be greater than the voltage level of the first driving signal ULS_TX2a applied to the first sensor TX2.

In some embodiments, the voltage level of the first driving signal ULS_TX1a applied to the first sensor TX1 may be the same or substantially the same as the voltage level of the first driving signal ULS_TX2a applied to the first sensor TX2. For example, the voltage level of the first driving signal ULS_TX2a may be increased and be the same or substantially the same as the voltage level of the first driving signal ULS_TX1a. As a result, a stronger signal may be obtained regardless of the position at the edge of the sensor unit 120, thereby improving sensing sensitivity at the edge.

I voltage level of the first driving signal ULS_TX1a applied to the first sensor TX1 may be lower than the voltage level of the first driving signal ULS_TX2a applied to the first sensor TX2. Depending on the configuration of the sensor unit 120, the amount to which the first sensor TX1 disposed at the outermost contributes to improving sensing sensitivity may be lower than at the amount to which the first sensor TX2 contributes to improving sensing sensitivity. In this case, power consumption may be reduced by setting the voltage level of the first driving signal ULS_TX1a lower, and sensing sensitivity may be optimized or improved by setting the voltage level of the first driving signal ULS_TX2a higher than the voltage levels of the driving signals at the central portion of the sensor unit 120.

Referring to FIG. 15, during the object sensing period, the voltage levels of the second driving signals (ULS_RX1a, ULS_RX2a, ULS_RX8a, ULS_RX9a) applied to the second sensors (RX1, RX2, RX8, RX9) disposed at the edge of the sensor unit 120 may be greater than the voltage levels of the second driving signals (ULS_RX3a, ULS_RX4a, ULS_RX5a, ULS_RX6a, ULS_RX7a) applied to the second sensors (RX3, RX4, RX5, RX6, RX7) disposed at the central portion of the sensor unit 120. In FIG. 15, the length of the second driving signals (ULS_RX1a to ULS_RX9a) in the third direction DR3 indicates the voltage level. For example, the voltage level of the second driving signal ULS_RX1a applied to the second sensor RX1 may be greater than the voltage level of the second driving signal ULS_RX2a applied to the second sensor RX2.

In some embodiments, the voltage level of the second driving signal ULS_RX1a applied to the second sensor RX1 may be the same or substantially the same as the voltage level of the second driving signal ULS_RX2a applied to the second sensor RX2. For example, the voltage level of the second driving signal ULS_RX2a may be increased and be the same or substantially the same as the voltage level of the second driving signal ULS_RX1a. As a result, a stronger signal may be obtained regardless of the position at the edge of the sensor unit 120, thereby improving sensing sensitivity at the edge.

The voltage level of the second driving signal ULS_RX1a applied to the second sensor RX1 may be lower than the voltage level of the second driving signal ULS_RX2a applied to the second sensor RX2. Depending on the configuration of the sensor unit 120, the amount to which the second sensor RX1 disposed at the outermost contributes to improving sensing sensitivity may be lower the amount to which the second sensor RX2 contributes to improving sensing sensitivity. In this case, power consumption may be reduced by setting the voltage level of the second driving signal ULS_RX1a lower, and sensing sensitivity may be optimized or improved by setting the voltage level of the second driving signal ULS_RX2a higher than the voltage levels of the driving signals at the central portion of the sensor unit 120.

Figure 16:
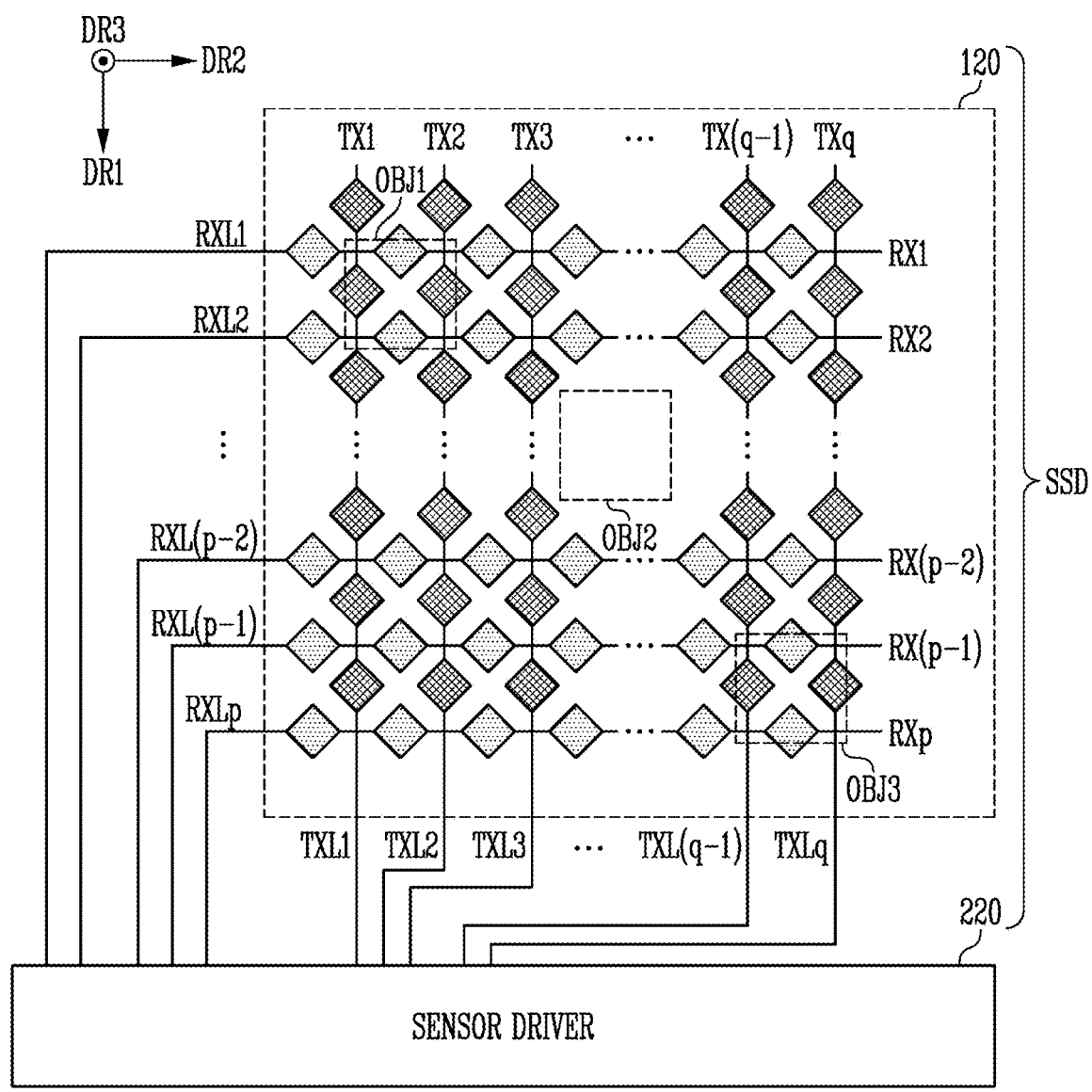
FIGS. 16-18 illustrate first and second driving signals and phases, according to one or more embodiments of the present disclosure.
Figure 17:
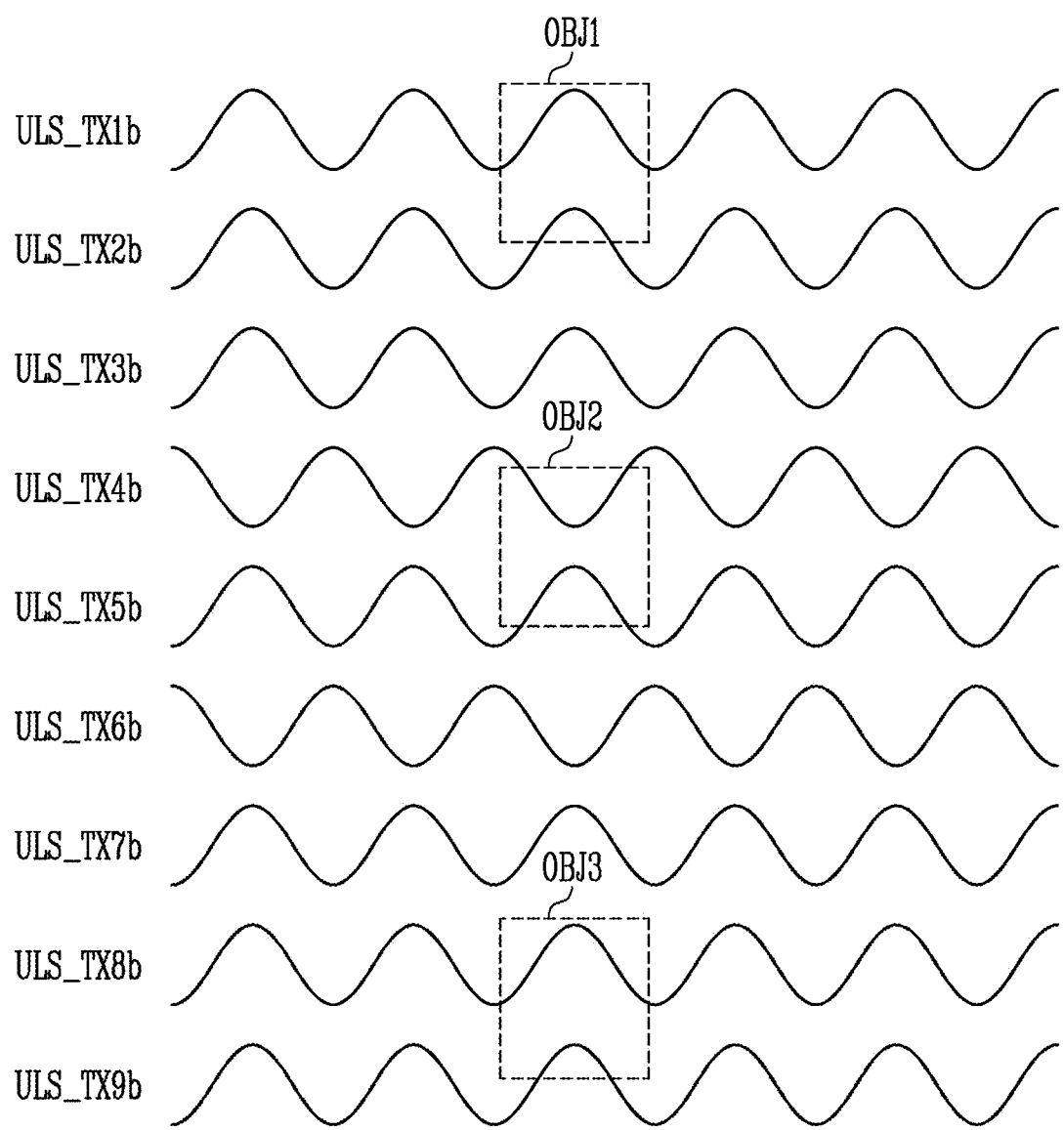
Figure 18:
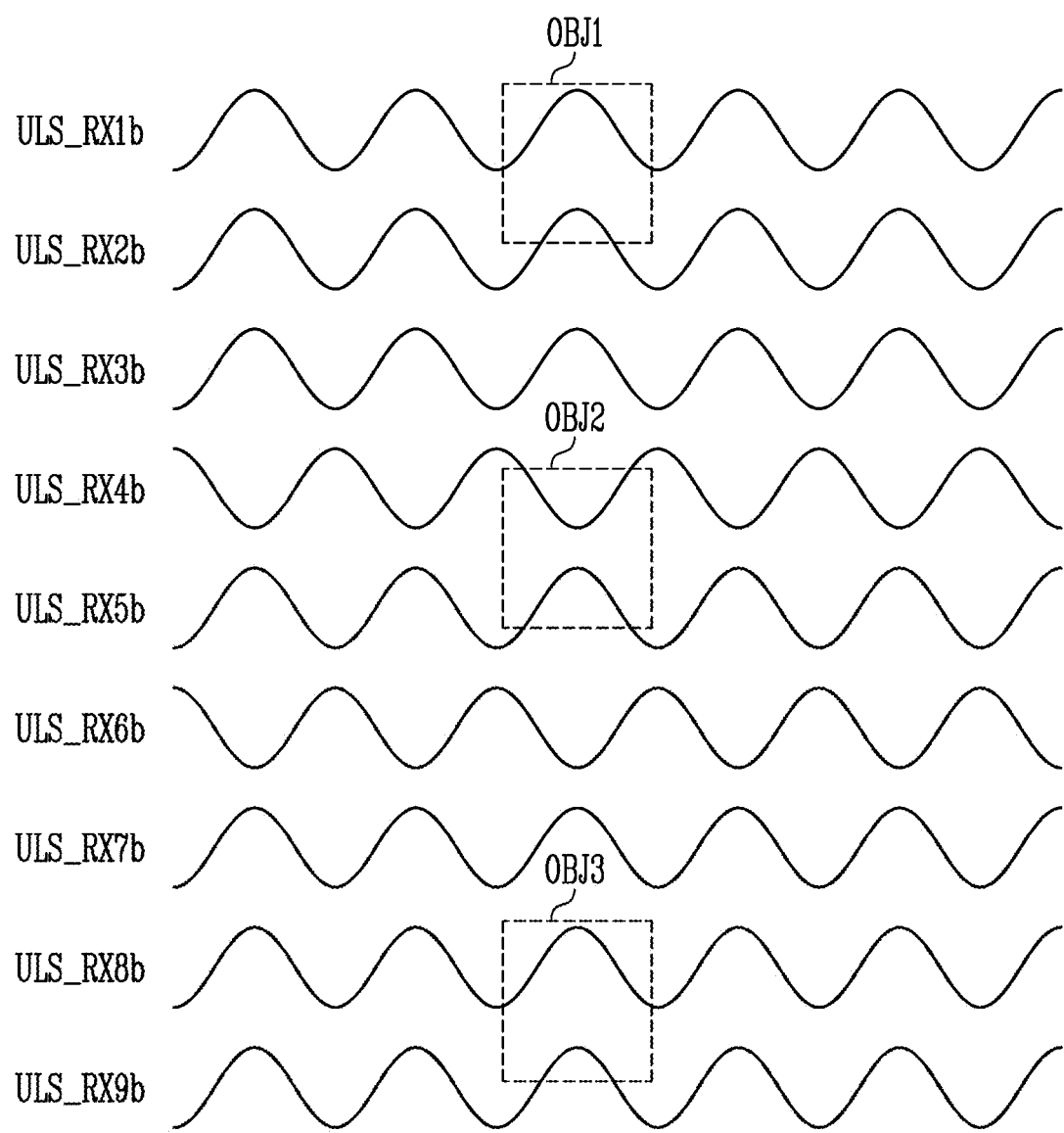

FIG. 16 to FIG. 18 are drawings for explaining first and second driving signals whose phases are set, according to some embodiments of the present disclosure.

Referring to FIG. 16, an example in which a case in which a first object OBJ1, a second object OBJ2, or a third object OBJ3 is positioned on a plane of the sensor unit 120 is illustrated. The first object OBJ1 and the third object OBJ3 may be positioned at the edge of the sensor unit 120. The receiving electrode of the first object OBJ1 may form the largest capacitances with the first sensors TX1 and TX2 and the second sensors RX1 and RX2 among the sensors. The receiving electrode of the third object OBJ3 may form the largest capacitances with the first sensors TX(q−1) and TXq and the second sensors RX(p−1) and RXp among the sensors. In FIG. 17 to FIG. 22, p is 9 and q is 9 The second object OBJ2 may be positioned at the central portion of the sensor unit 120.

Referring to FIG. 17, during the object sensing period, the phase differences of the first driving signals (ULS_TX1b, ULS_TX2b, ULS_TX8b, ULS_TX9b) applied to the first sensors (TX1, TX2, TX(q−1), TXq) disposed at the edge of the sensor unit 120 may different from the phase differences of the first driving signals (ULS_TX4b, ULS_TX5b) applied to the first sensors disposed at the central portion of the sensor unit 120.

For example, during the object sensing period, the phases of the first driving signals (ULS_TX1b, ULS_TX2b, ULS_TX8b, ULS_TX9b) applied to the first sensors (TX1, TX2, TX(q−1), TXq) disposed at the edge of the sensor unit 120 may cause constructive interference compared to the phases of the first driving signals (ULS_TX4b, ULS_TX5b) applied to the first sensors disposed at the central portion of the sensor unit 120.

For example, during the object sensing period, a phase difference between the first driving signals (ULS_TX1b, ULS_TX2b, ULS_TX8b, ULS_TX9b) applied to the first sensors (TX1, TX2, TX(q−1), TXq) disposed at the edge of the sensor unit 120 may be smaller than a phase difference between the first driving signals (ULS_TX4b, ULS_TX5b) applied to the first sensors disposed at the central portion of the sensor unit 120. For example, a phase difference between the first driving signals ULS_TX1b and ULS_TX2b may be about 0 degrees. A phase difference between the first driving signals ULS_TX4b and ULS_TX5b may be about 180 degrees. A phase difference between the first driving signals ULS_TX8b and ULS_TX9b may be about 0 degrees.

Referring to FIG. 18, during the object sensing period, the phase differences of the second driving signals (ULS_RX1b, ULS_RX2b, ULS_RX8b, ULS_RX9b) applied to the second sensors (RX1, RX2, RX(p−1), RXp) disposed at the edge of the sensor unit 120 may different from the phase differences of the second driving signals (ULS_RX4b, ULS_RX5b) applied to the second sensors disposed at the central portion of the sensor unit 120.

For example, during the object sensing period, the phases of the second driving signals (ULS_RX1b, ULS_RX2b, ULS_RX8b, ULS_RX9b) applied to the second sensors (RX1, RX2, RX(p−1), RXp) disposed at the edge of the sensor unit 120 may cause more constructive interference compared to the phases of the second driving signals (ULS_RX4b, ULS_RX5b) applied to the second sensors disposed at the central portion of the sensor unit 120.

For example, during the object sensing period, the phase difference between the second driving signals (ULS_RX1b, ULS_RX2b, ULS_RX8b, ULS_RX9b) applied to the second sensors (RX1, RX2, RX(p−1), RXp) disposed at the edge of the sensor unit 120 may be smaller than the phase difference between the second driving signals (ULS_RX4b, ULS_RX5b) applied to the second sensors disposed at the central portion of the sensor unit 120. For example, a phase difference between the second driving signals ULS_RX1b and ULS_RX2b may be about 0 degrees. A phase difference between the second driving signals ULS_RX4b and ULS_RX5b may be about 180 degrees. A phase difference between the second driving signals ULS_RX8b and ULS_RX9b may be about 0 degrees.

Figure 19:
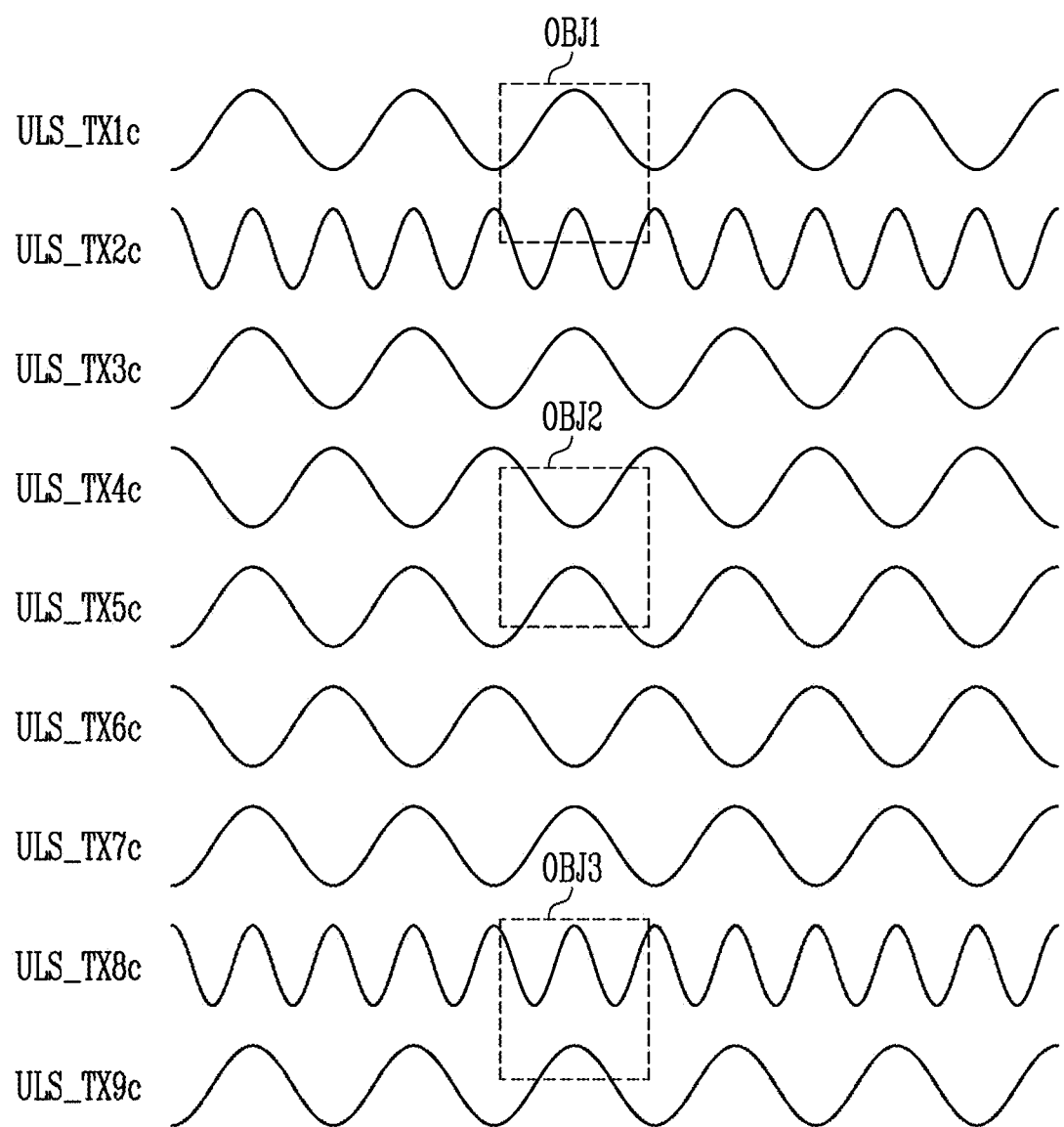
FIG. 19 and FIG. 20 illustrate first and second driving signals and frequencies, according to one or more embodiments of the present disclosure.
Figure 20:
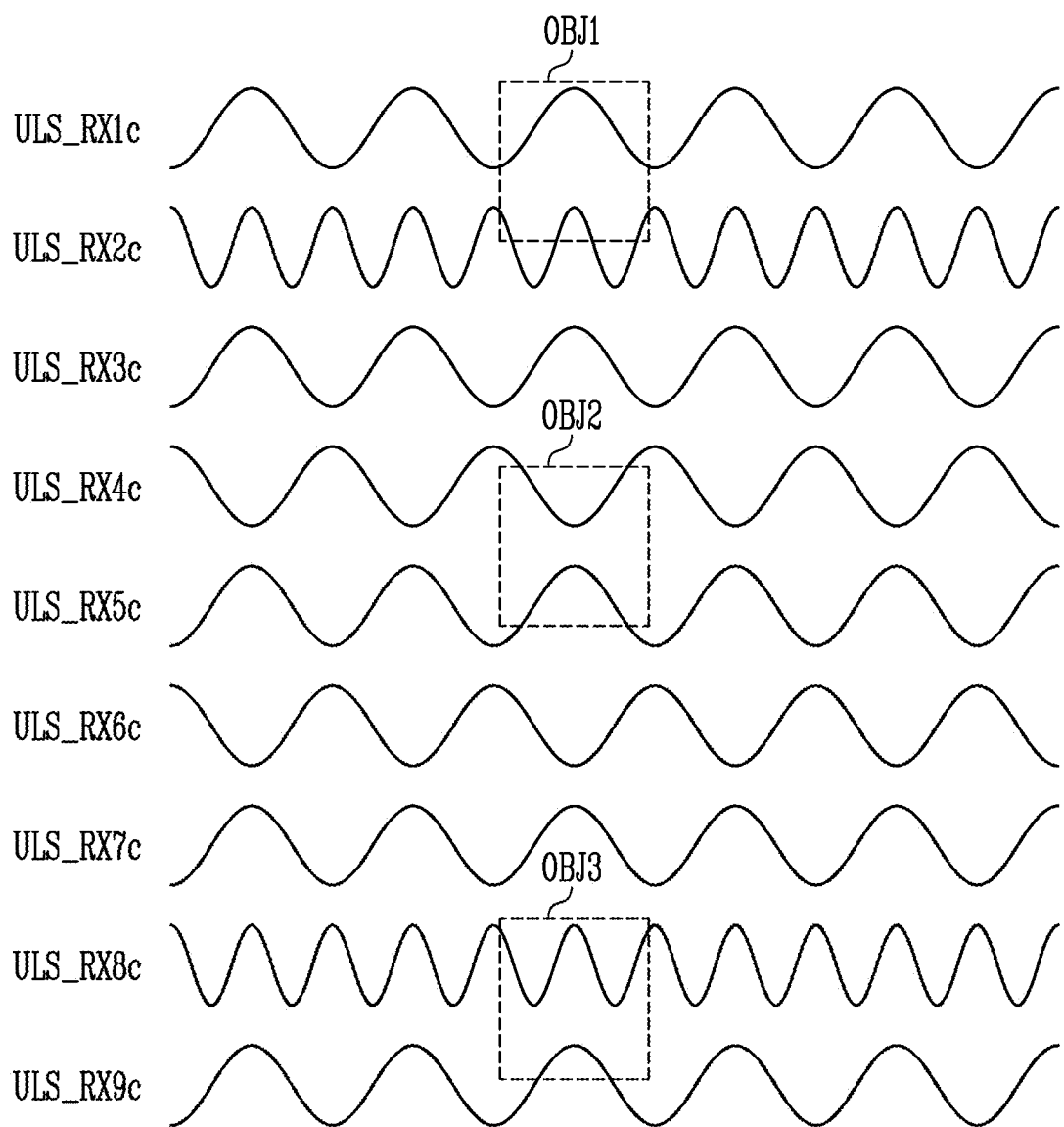

FIG. 19 and FIG. 20 are drawings for explaining first and second driving signals whose frequencies are set, according to some embodiments of the present disclosure.

Referring to FIG. 19, during the object sensing period, the ratios of frequencies of the first driving signals (ULS_TX1c, ULS_TX2c, ULS_TX8c, ULS_TX9c) applied to the first sensors (TX1, TX2, TX(q−1), TXq) disposed at the edge of the sensor unit 120 may different from the ratio of frequencies of the first driving signals (ULS_TX4c, ULS_TX5c) applied to the first sensors disposed at the central portion of the sensor unit 120.

For example, during the object sensing period, the frequencies of the first driving signals (ULS_TX1c, ULS_TX2c, ULS_TX8c, ULS_TX9c) applied to the first sensors (TX1, TX2, TX(q−1), TXq) disposed at the edge of the sensor unit 120 may cause more constructive interference compared to the frequencies of the first driving signals (ULS_TX4c, ULS_TX5c) applied to the first sensors disposed at the central portion of the sensor unit 120.

For example, the frequency of the first driving signal ULS_TX2c applied to the first sensor TX2 may be about twice the frequency of the first driving signal ULS_TX1c applied to the first sensor TX2. In this case, the first driving signal ULS_TX2c and the first driving signal ULS_TX1c may cause partial constructive interference.

Referring to FIG. 20, during the object sensing period, the ratios of frequencies of the second driving signals (ULS_RX1c, ULS_RX2c, ULS_RX8c, ULS_RX9c) applied to the second sensors (RX1, RX2, RX(p−1), RXp) disposed at the edge of the sensor unit 120 may different from the ratio of frequencies of the second driving signals (ULS_RX4c, ULS_RX5c) applied to the second sensors disposed at the central portion of the sensor unit 120.

For example, during the object sensing period, the frequencies of the second driving signals (ULS_RX1c, ULS_RX2c, ULS_RX8c, ULS_RX9c) applied to the second sensors (RX1, RX2, RX(p−1), RXp) disposed at the edge of the sensor unit 120 may cause more constructive interference compared to the frequencies of the second driving signals (ULS_RX4c, ULS_RX5c) applied to the second sensors disposed at the central portion of the sensor unit 120.

For example, the frequency of the second driving signal ULS_RX2c applied to the second sensor RX2 may be about twice the frequency of the second driving signal ULS_RX1c applied to the second sensor RX1. In this case, the second driving signal ULS_RX2c and the second driving signal ULS_RX1c may cause partial constructive interference.

Figure 21:
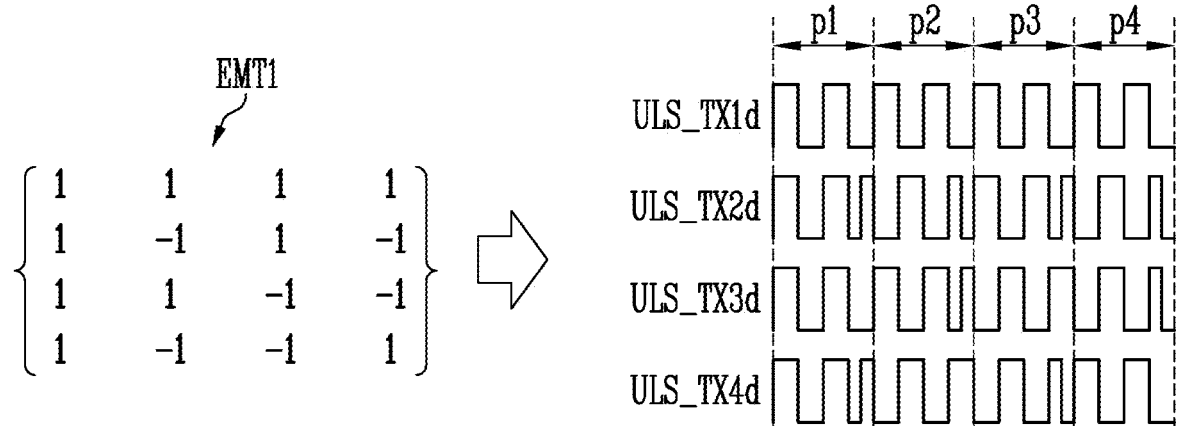
FIG. 21 and FIG. 22 illustrate first and second driving signals and codes, according to one or more embodiments of the present disclosure.
Figure 22:
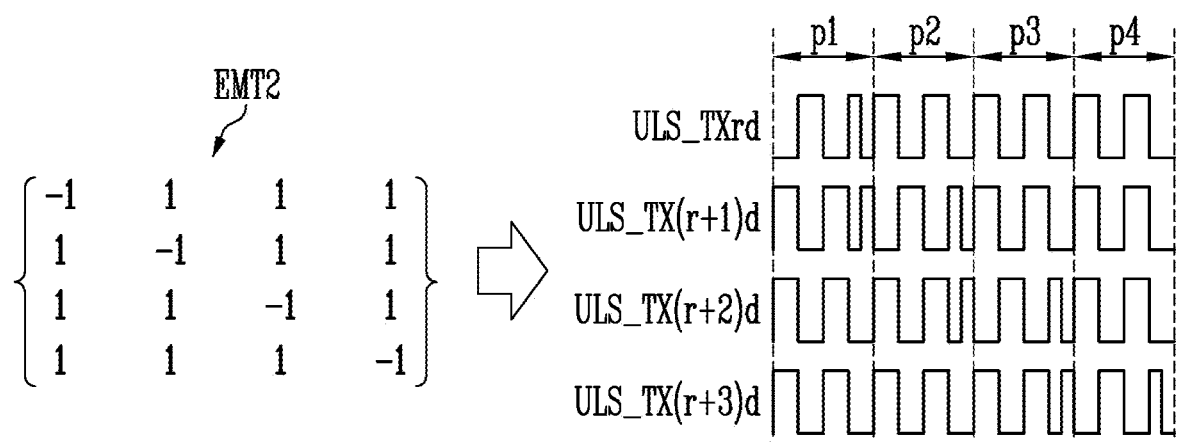

FIG. 21 and FIG. 22 are drawings for explaining first and second driving signals whose codes are set, according to some embodiments of the present disclosure.

Referring to FIG. 21 and FIG. 22, during the object sensing period, the codes of the first driving signals (ULS_TX1d, ULS_TX2d, ULS_TX3d, ULS_TX4d) applied to the first sensors (TX1, TX2, TX3, . . . ) disposed at the edge of the sensor unit 120 may be different from the codes of the first driving signals (ULS_TXrd, ULS_TX(r+1)d, ULS_TX(r+2)d, ULS_TX(r+3)d) applied to the first sensors disposed at the central portion of the sensor unit 120.

For example, during the object sensing period, the codes of the first driving signals (ULS_TX1d, ULS_TX2d, ULS_TX3d, ULS_TX4d) applied to the flt sensors (TX1, TX2, TX3, . . . ) disposed at the edge of the sensor unit 120 may cause more constructive interference compared to the codes of the first driving signals (ULS_TXrd, ULS_TX(r+1)d, ULS_TX(r+2)d, ULS_TX(r+3)d) applied to the first sensors disposed at the central portion of the sensor unit 120.

In FIG. 21, a first encoding matrix EMT1 applied to foulirst sensors (TX1, TX2, TX3, . . . ) sequentially disposed at the edge of the sensor unit 120 is shown as an example. The first row of the first encoding matrix EMT1 may be a code of the first driving signal ULS_TX1d applied to the first sensor TX1. The second row of the first encoding matrix EMT1 may be a code of the first driving signal ULS_TX2d applied to the first sensor TX2. The third row of the first encoding matrix EMT1 may be a code of the first driving signal ULS_TX3d applied to the first sensor TX3. The fourth row of the first encoding matrix EMT1 may be a code of the first driving signal ULS_TX4d applied to the fourth first sensor. Among the codes, 1 and −1 may indicate voltage pulses with opposite phases. The first column of the first encoding matrix EMT1 may indicate the code to be applied in the first period p1, the second column thereof may indicate the code to be applied in the second period p2, the third column thereof may indicate the code to be applied in the third period p3, and the fourth column thereof may indicate the code to be applied in the fourth period p4.

Accordingly, the sensor unit 120 may transmit an uplink signal ULS corresponding to code 4 in the first period p1, an uplink signal ULS corresponding to code 0 in the second period p2, an uplink signal ULS corresponding to code 0 in the third period p3, and an uplink signal ULS corresponding to code 0 in the fourth period p4. Accordingly, the sensor unit 120 may transmit an uplink signal ULS in which constructive interference has partially occurred during the first period p1.

In FIG. 22, a second encoding matrix EMT2 applied to four first sensors sequentially disposed at the central portion of the sensor unit 120 is shown as an example. The first row of the second encoding matrix EMT2 may be a code of the first driving signal ULS_TXrd applied to the r-th first sensor. The second row of the second encoding matrix EMT2 may be a code of the first driving signal ULS_TX(r+1)d applied to the (r+1)-th first sensor. The third row of the second encoding matrix EMT2 may be a code of the first driving signal ULS_TX(r+2)d applied to the (r+2)-th first sensor. The fourth row of the second encoding matrix EMT2 may be a code of the first driving signal ULS_TX(r+3)d applied to the (r+3)-th first sensor. Among the codes, 1 and −1 may indicate voltage pulses with opposite phases. The first column of the second encoding matrix EMT2 may indicate the code to be applied in the first period p1, the second column thereof may indicate the code to be applied in the second period p2, the third column thereof may indicate the code to be applied in the third period p3, and the fourth column thereof may indicate the code to be applied in the fourth period p4.

Accordingly, the sensor unit 120 may transmit an uplink signal ULS corresponding to code 2 in the first period p1, an uplink signal ULS corresponding to code 2 in the second period p2, an uplink signal ULS corresponding to code 2 in the third period p3, and an uplink signal ULS corresponding to code 2 in the fourth period p4.

Referring to FIG. 21 and FIG. 22, the voltage level of the uplink signal ULS of code 4 transmitted from the edge of the sensor unit 120 during the first period p1 may be twice the voltage level of the uplink signal ULS of code 2 transmitted from the central portion of the sensor unit 120.

Since the descriptions of FIG. 21 and FIG. 22 may be equally applied to the second driving signals of the second sensors, redundant descriptions will be omitted.

In addition, the voltage level, frequency, phase, and code have been separately described in FIG. 14 to FIG. 22, but one or more embodiments of FIG. 14 to FIG. 22 may be combined with each other.

FIG. 23 to FIG. 29 are drawings for explaining a configuration of a display device. Reference numerals of FIG. 23 to FIG. 29 and the reference numerals of FIG. 1 to FIG. 22 are independent of each other.

Figure 23:
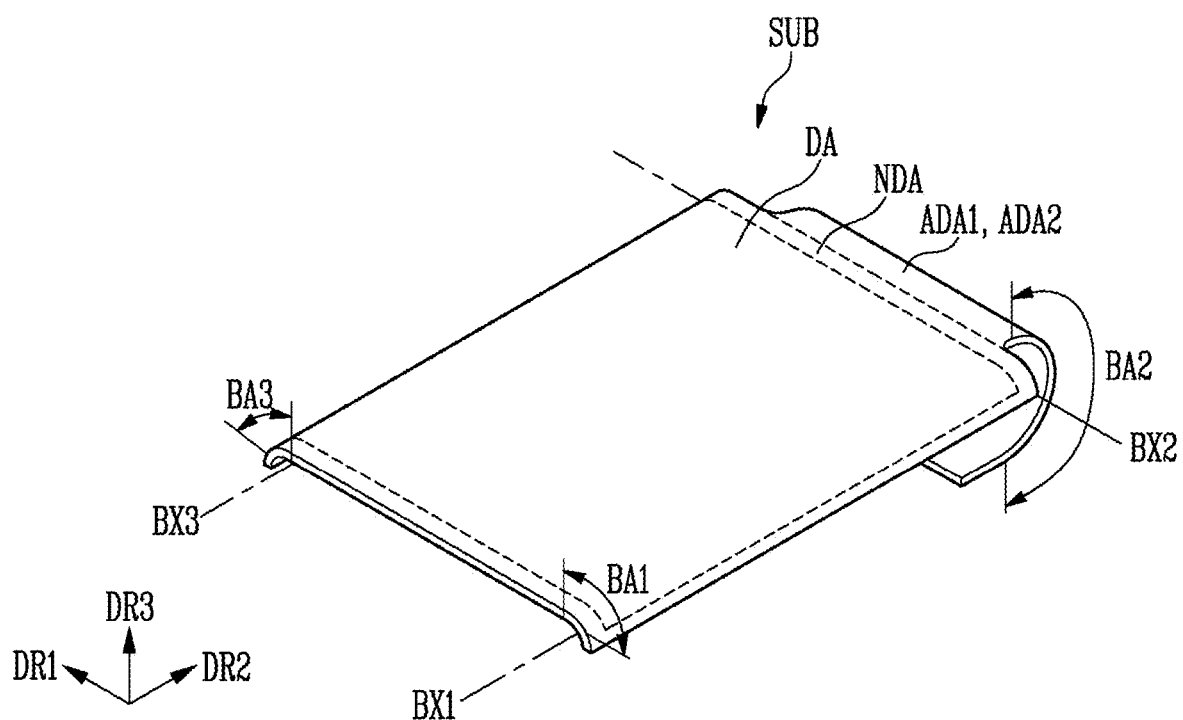
FIGS. 23-29 illustrate an example configuration of a display device, according to one or more embodiments of the present disclosure.
Figure 24:
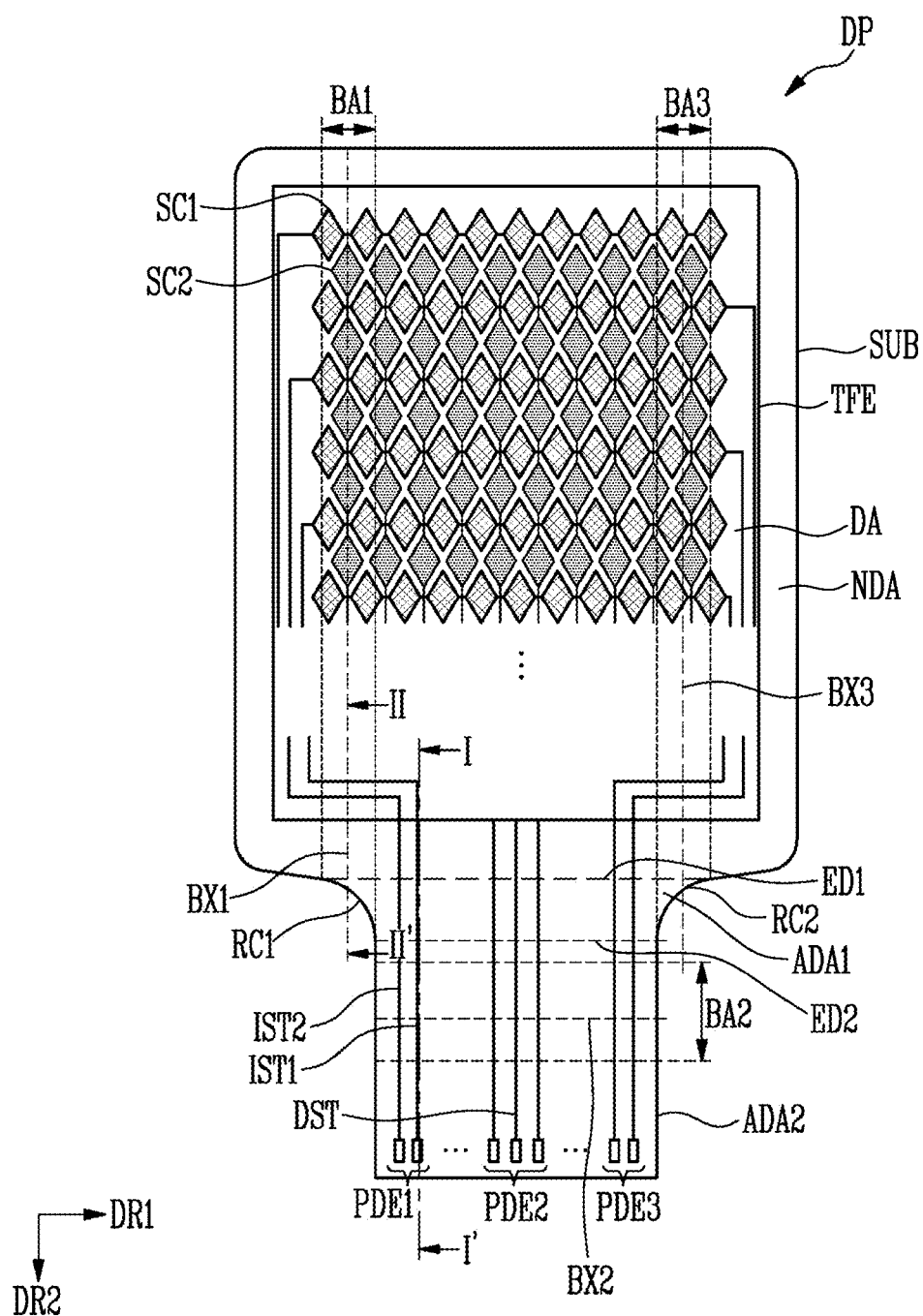

FIG. 23 is a drawing for explaining a substrate according to some embodiments of the present disclosure, and FIG. 24 is a drawing for explaining a display device according to some embodiments of the present disclosure.

In the following embodiments, a position of a plane may be defined by the first direction DR1 and the second direction DR2, and a position of a height may by defined by the third direction DR3 (see FIG. 25). The first direction DR1, the second direction DR2, and third direction DR3 may be directions orthogonal to each other.

A substrate SUB may include a display area DA, a non-display area NDA, a first additional area ADA1, and a second additional area ADA2.

The display area DA may have a rectangular shape. Each corner of the display area DA may have an angled shape or a curved shape. In addition, in a case of a circular display, the display area DA may have a circular shape. In addition, the display area DA may have a polygonal shape other than a quadrangular shape and an elliptical shape. As such, the shape of the display area DA may be differently set depending on a product.

Pixels may be disposed on the display area DA. Depending on a type of the display device DP, respective pixels may include a light emitting diode or a liquid crystal layer.

The non-display area NDA may surround a periphery of the display area DA. For example, the non-display area NDA may have a rectangular shape. Each corner of the non-display area NDA may have an angled shape or a curved shape. FIG. 14 illustrates a an embodiment in which each corner of the non-display area NDA has a curved shape. The non-display area NDA may have a circular shape. To minimize or reduce the non-display area NDA in a narrow bezel structure, a shape of the non-display area NDA may be similar to that of the display area DA.

The first additional area ADA1 may be disposed between the non-display area NDA and the second additional area ADA2. The first additional area ADA1 may be connected to the non-display area NDA at a first boundary ED1. The first additional area ADA1 may be connected to the second additional area ADA2 at a second boundary ED2. The first boundary ED1 and the second boundary ED2 may extend in the first direction DR1, respectively.

A width of the first additional area ADA1 may become narrower from the first boundary ED1 to the second boundary ED2. For example, the width of the first additional area ADA1 in the first direction DR1 may become narrower toward the second direction DR2, in other words away from the display area DA. For example, the length of the first boundary ED1 in first direction DR1 may be greater than the length of the second boundary ED2 in the first direction DR1. Accordingly, the first additional area ADA1 may include curved first and second lateral surfaces RC1 and RC2. The lateral surfaces RC1 and RC2 may be curved toward the inside of the substrate (e.g., a center of the substrate).

In FIG. 24, the first additional area ADA1 is illustrated to include two lateral surfaces RC1 and RC2 in the first direction DR1 and an opposite direction thereof. In some embodiments, the first additional area ADA1 may include only the first lateral surface RC1 because the boundary positioned in the first direction DR1 coincides with the boundary of the non-display area NDA. In some embodiments, the first additional area ADA1 may include only the second lateral surface RC2 because the boundary positioned in the opposite direction of the first direction DR1 coincides with the boundary of the non-display area NDA.

The second additional area ADA2 may have a rectangular shape. Each corner of the second additional area ADA2 may have an angled shape or a curved shape.

An encapsulation film TFE may be disposed on the pixels. For example, the encapsulation film TFE may cover the pixels in the display area DA, and a boundary of the encapsulation film TFE may be disposed in the non-display area NDA. The encapsulation film TFE may cover the light emitting elements and the circuit elements of the pixels of the display area DA, thereby preventing damage from external moisture or impact.

Sensing electrodes SC1 and SC2 may be disposed on the encapsulation film TFE. The sensing electrodes SC1 and SC2 may detect a touch, hovering, gesture, proximity, or the like by the user's body. The sensing electrodes SC1 and SC2 may be configured in different shapes according to various methods, such as a resistive type, a capacitive type, an electromagnetic induction type (EMI), an electromagnetic resonance type (EMR), and an optical type. For example, when the sensing electrodes SC1 and SC2 are configured in a capacitive type, the sensing electrodes SC1 and SC2 may be configured in a self-capacitive type or a mutual-capacitive type. Hereinafter, for better understanding and ease of description, a case in which the sensing electrodes SC1 and SC2 are configured in a mutual-capacitive type will be described as an example.

When the sensing electrodes SC1 and SC2 are configured in a mutual capacitive type, a driving signal is transmitted through a sensing wire corresponding to the first sensing electrode SC1, and a sensing signal may be received through a sensing wire corresponding to the second sensing electrode SC2 forming mutual capacitance with the first sensing electrode SC1. When the user's body approaches, the mutual capacitance between the first sensing electrode SC1 and the second sensing electrode SC2 may be changed, and depending on a difference between the sensing' signals, whether there is the user's touch may be determined. In some embodiments, a driving signal may be transmitted through a sensing wire corresponding to the second sensing electrode SC2, and a sensing signal may be received through a sensing wire corresponding to the first sensing electrode SC1 forming mutual capacitance with the second sensing electrode SC2.

Pads PDE1, PDE2, and PDE3 may be disposed on the second additional area ADA2. The pads PDE1 and PDE3 may be connected to the sensing electrodes SC1 and SC2 disposed on the encapsulation film through sensing wires IST1 and IST2. The pads PDE1 and PDE3 may be connected to an external touch integrated chip (IC). In addition, the pads PDE2 may be connected to pixels, or a driver of the pixels disposed under the encapsulation film TFE through display wires DST. The driver may include a scan driver, a light emission driver, a data driver, and/or the like. The driver may be disposed under the encapsulation film TFE, or may be disposed on an external display IC connected to through the pads PDE2.

When the display device DP is a mutual capacitive type, the touch IC may transmit a driving signal through the first sensing wire IST1, and may receive a sensing signal through the second sensing wire IST2. In some embodiments, the driving signal may be transmitted through the second sensing wire IST2, and the sensing signal may be received through the first sensing wire IST1. For reference, when the display device DP is a self-capacitive type, there may be no difference in driving methods of the first sensing wire IST1 and the second sensing wire IST2. The display wires DST may include a control line, a data line, a power line, and/or the like, and may provide signals so that the pixels may display an image. These signals may be provided from a driver connected to the display wires DL.

FIG. 23 illustrates a state in which the substrate SUB is bent, and FIG. 24 illustrates a state in which the substrate SUB is not bent. The display device DP may be bent as shown in FIG. 23 after elements are stacked on the substrate SUB in a state that is not bent as shown in FIG. 24.

The substrate SUB may include a first bending area BA1 extending from the first lateral surface RC1 of the first additional area ADA1 to overlap with the non-display area NDA. Additionally, the first bending area BA1 may extend to overlap with the display area DA. For example, each of the display area DA, the non-display area NDA, and the first additional area ADA1 may partially overlap with the first bending area BA1. The first bending area BA1 may have a width in the first direction DR1, and may extend in length in the second direction DR2. A first bending axis BX1 may be defined as a folding line extending from a center of the first bending area BA1 in the second direction DR2. In some embodiments, the first bending area BA1 may be a portion in which a stress is reduced by removing a portion of an insulating film thereof, unlike other portions in the vicinity thereof. In some embodiments, the first bending area BA1 may have the same or substantially the same configuration as other portions around it.

The substrate SUB may include a third bending area BA3 extending from the second lateral surface RC2 of the first additional area ADA1 to overlap with the non-display area NDA. Additionally, the second bending area BA3 may extend to overlap with the display area DA. For example, each of the display area DA, the non-display area NDA, and the first additional area ADA1 may partially overlap with the third bending area BA3. The third bending area BA3 may have a width in the first direction DR1, and may extend in length in the second direction DR2. A third bending axis BX3 may be defined as a folding line extending from a center of the third bending area BA3 in the second direction DR2. In some embodiments, the third bending area BA3 may be a portion in which a stress is reduced by removing a portion of an insulating film thereof, unlike other portions in the vicinity thereof. In some embodiments, the third bending area BA3 may have the same or substantially the same configuration as other portions around it.

The second additional area ADA2 may include a second bending area BA2. The second bending area BA2 may have a width in the second direction DR2, and may extend in length in the first direction DR1. A second bending axis BX2 may be defined as a folding line extending from a center of the second bending area BA2 in the first direction DR1. In some embodiments, the second bending area BA2 may be a portion in which a stress is reduced by removing a portion of an insulating film thereof, unlike other portions in the vicinity thereof. In some embodiments, the second bending area BA2 may have the same or substantially the same configuration as other portions around it.

The first to third bending areas BA1, BA2, and BA3 may not overlap with each other.

Herein, the term "folded" means that a shape is not fixed, but an original shape may be changed to another shape, and the shape is folded, curved, or rolled along one or more bending axes. By the first and third bending areas BA1 and BA3, the side bezel width of the opposite direction of the first direction DR1 of the display device DP and a width of the side bezel of the first direction DR1 may be reduced. In addition, a width of the side bezel of the second direction DR2 of the display device DP may be reduced by the second bending area BA2.

Figure 25:
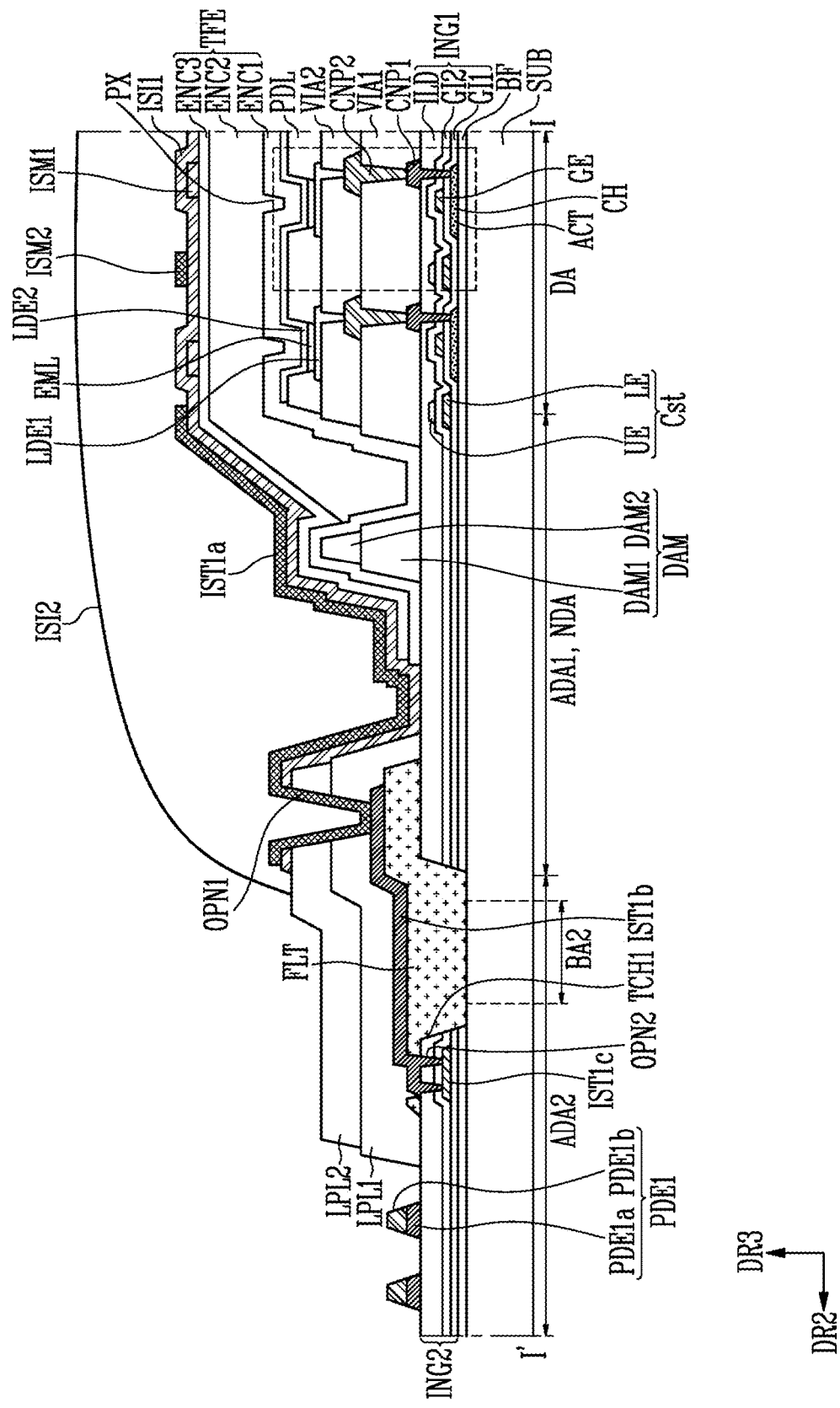

FIG. 25 illustrates a cross-sectional view taken along line I-I' of FIG. 24. Line I-I' in FIG. 24 passes through the first pad PDE1 and the first sensing wire IST1.

First, the display area DA will be described. In some embodiments, pixels PX are provided in the display area DA. Each pixel PX may include a transistor connected to a corresponding wire among the display wires DST, a light emitting element connected to the transistor, and a capacitor Cst. In FIG. 25, for better understanding and ease of description, one transistor, one light emitting element, and one capacitor Cst are illustrated as an example for one pixel PX.

The substrate SUB may be made of an insulating material, such as glass or a resin. In addition, the substrate SUB may be made of a flexible material to be bendable or foldable, and may have a single-layered structure or a multi-layered structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate. However, the material included in the substrate SUB may be variously changed, and may also include fiber reinforced plastic (FRP).

For example, when the substrate SUB has a multi-layered structure, inorganic materials such as a silicon nitride, a silicon oxide, and a silicon oxynitride may be interposed between a plurality of layers, in a single layer, or in a plurality of layers.

A buffer film BF may cover the substrate SUB. The buffer film BF may prevent impurities from diffusing into a channel CH of the transistor. The buffer film BF may be an inorganic insulating film made of an inorganic material. For example, the buffer film BF may be made of a silicon nitride, a silicon oxide, a silicon oxynitride, and/or the like, and may be omitted depending on the materials and the process conditions of the substrate SUB. In some embodiments, a barrier layer may be further provided.

An active film ACT may be disposed on the buffer film BF. The active film ACT may be patterned to form a channel, a source electrode, and a drain electrode of a transistor, or to form a wire. The active film ACT may be made of a semiconductor material. The active film ACT may be a semiconductor pattern made of polysilicon, amorphous silicon, and/or an oxide semiconductor. The channel of the transistor is a semiconductor pattern that is not doped with an impurity, and may be an intrinsic semiconductor. The source electrode, the drain electrode, and the wire may be a semiconductor pattern doped with an impurity. An N-type impurity, a P-type impurity, and other impurities such as metal may be used as the impurity.

A first gate insulating film GI1 may cover the active film ACT. The first gate insulating film GI1 may be an inorganic insulating film made of an inorganic material. The inorganic insulating material may include polysiloxane, a silicon nitride, a silicon oxide, and/or a silicon oxynitride.

A gate electrode GE of the transistor and a lower electrode LE of the capacitor Cst may be disposed on the first gate insulating film GI1. The gate electrode GE may overlap with an area corresponding to the channel CH.

The gate electrode GE and the lower electrode LE may be made of metal. For example, the gate electrode GE may be made of at least one of gold (Au), silver (Ag), aluminum (Al), molybdenum (Mo), chromium (Cr), titanium (Ti), nickel (Ni), neodymium (Nd), and copper (Cu), or an alloy thereof. In addition, the gate electrode GE may be formed as a single film, but is not limited thereto, and may be formed as a multi-film in which two or more materials among metals and alloys are stacked.

A second gate insulating film GI2 may cover the gate electrode GE and the lower electrode LE. The second gate insulating film GI2 may be an inorganic insulating film made of an inorganic material. The inorganic material may include polysiloxane, a silicon nitride, a silicon oxide, and/or a silicon oxynitride.

An upper electrode UE of the capacitor Cst may be disposed on the second gate insulating film GI2. The upper electrode UE of the capacitor may be made of metal. For example, the upper electrode UE may be made of at least one of gold (Au), silver (Ag), aluminum (Al), molybdenum (Mo), chromium (Cr), titanium (Ti), nickel (Ni), neodymium (Nd), and copper (Cu), or an alloy thereof. In addition, the upper electrode UE may be formed as a single film, but is not limited thereto, and may be formed as a multi-film in which two or more materials among metals and alloys are stacked.

The lower electrode LE and the upper electrode UE may comprise the capacitor Cst with the second gate insulating film GI2 interposed therebetween. In FIG. 15, the capacitor Cst is shown to have a two-layered electrode structure of the lower electrode LE and the upper electrode UE, but in some embodiments, the capacitor Cst may have a three-layered electrode structure by using the active layer ACT, or may have a three-layer electrode structure or a four or more layered structure by using an electrode of the same or substantially the same layer as a first connection pattern CNP1.

An interlayer insulating film ILD may cover the upper electrode UE. The interlayer insulating film ILD may be an inorganic insulating film made of an inorganic material. The inorganic material may include polysiloxane, a silicon nitride, a silicon oxide, and/or a silicon oxynitride.

For better understanding and ease of description in the present embodiment, the first gate insulating film GI1, the second gate insulating film GI2, and the interlayer insulating film ILD may be referred to as a first insulating film group ING1. The first insulating film group ING1 may cover a portion of the transistor. In some embodiments, the first insulating film group ING1 may further include the buffer film BF.

The first connection pattern CNP1 may be disposed on the interlayer insulating film ILD. The first connection pattern CNP1 may contact a source electrode and a drain electrode of the active film ACT through contact holes formed in the interlayer insulating film ILD, the second gate insulating film GI2, and the first gate insulating film GI1, respectively.

The first connection pattern CNP1 may be made of metal. For example, the source electrode SE and the drain electrode DE may be made of at least one of gold (Au), silver (Ag), aluminum (Al), molybdenum (Mo), chromium (Cr), titanium (Ti), nickel (Ni), neodymium (Nd), and copper (Cu), or an alloy thereof.

In some embodiments, the passivation film may cover the first connection pattern CNP1. The passivation film may be an inorganic insulating film made of an inorganic material. The inorganic material may include polysiloxane, a silicon nitride, a silicon oxide, and/or a silicon oxynitride.

A first via film VIA1 may cover the passivation film or the transistor. The first via film VIA1 may be an organic insulating film made of an organic material. The organic material may be an organic insulating material, such as a polyacrylic compound, a polyimide compound, a fluorine-based carbon compound such as Teflon, a benzocyclobutene compound, and/or the like. The organic film may be deposited by a method such as evaporation.

A second connection pattern CNP2 may be connected to the first connection pattern CNP1 through the opening of the first via film VIA1. The second connection pattern CNP2 may be made of at least one of gold (Au), silver (Ag), aluminum (Al), molybdenum (Mo), chromium (Cr), titanium (Ti), nickel (Ni), neodymium (Nd), and copper (Cu), or an alloy thereof.

A second via film VIA2 may cover the first via film VIA1 and the second connection pattern CNP2. The second via film VIA2 may be an organic insulating film made of an organic material. The organic material may include an organic insulating material, such as a polyacrylic compound, a polyimide compound, a fluorine-based carbon compound such as Teflon, a benzocyclobutene compound, and/or the like.

A first light emitting element electrode LDE1 may be connected to the second connection pattern CNP2 through the opening of the second via film VIA2. Here, the first light emitting element electrode LDE1 may be an anode of the light emitting element in some embodiments.

In some embodiments, the configuration of the second via film VIA2 and the second connection pattern CNP2 may be omitted, and the first light emitting element electrode LDE1 may be directly connected to the first contact electrode CNP1 through the opening of the first via film VIA1.

The first light emitting element electrode LDE1 may be made of a metal film, such as Ag, Mg, Al, Pt, Pd, Au, Ni, Nd, Ir, Cr, and an alloy thereof and/or an indium tin oxide (ITO), an indium zinc oxide (IZO), a zinc oxide (ZnO), and indium tin zinc oxide (ITZO). The first light emitting element electrode LDE1 may be made of one type of metal, but is not limited thereto, and may be made of two or more types of metals, for example, an alloy of Ag and Mg.

The first light emitting element electrode LDE1 may be formed of a transparent conductive film when an image is to be provided in a lower direction of the substrate SUB. The first light emitting element electrode LDE1 may be formed of a metal reflective film and/or a transparent conductive film when an image is to be provided in an upper direction of the substrate SUB.

A pixel defining film PDL, partitioning a light emitting area of each pixel PX, is provided on the substrate SUB on which the first light emitting element electrode LDE1 is formed. The pixel defining film PDL may be an organic insulating film made of an organic material. The organic material may be an organic insulating material, such as a polyacrylic compound, a polyimide compound, a fluorine-based carbon compound such as Teflon, a benzocyclobutene compound, and/or the like.

The pixel defining film PDL may expose an upper surface of the first light emitting element electrode LDE1, and may protrude from the substrate SUB along a circumference of the pixel PX. A light emitting film EML may be provided in an area of the pixel PX surrounded by (e.g., around a periphery of) the pixel defining film PDL.

The light emitting film EML may include a low-molecular or high-molecular material. The low-molecular material may include a copper phthalocyanine (CuPc), (N,N'-Di (naphthalene-1-yl)-N,N'-diphenyl-benzidine:
 NPB), (tris-8-hydroxyquinoline aluminum) (Alq3), and/or the like. These materials may be formed by a method of vacuum deposition. The high-molecular material may include PEDOT, a poly-phenylenevinylene (PPV)-based material, and/or a polyfluorene-based material.

The light emitting film EML may be provided as a single layer, or may be provided as a multilayer including various functional layers. When the light emitting film EML is provided as a multilayer, it may have a structure in which a hole injection layer (HIL), a hole transport layer (HTL), an emission layer (EML), an electron transport layer (ETL), an electron injection layer (EIL) are stacked in a single or complex structure. Such an emission film EML may be formed by a screen printing method, an inkjet printing method, or a laser induced thermal imaging method (LITI).

In some embodiments, at least a portion of the emission film EML may be integrally formed on a plurality of first light emitting element electrodes LDE1, and the emission film EML may be individually provided to correspond to each of the plurality of first light emitting element electrodes LDE1.

A second light emitting element electrode LDE2 may be provided on the emission film EML. The second light emitting element electrode LDE2 may be provided for each pixel PX, but may be provided to cover most of the display area DA, and may be shared by a plurality of pixels PX.

In some embodiments, the second light emitting element electrode LDE2 may be used as a cathode or an anode. When the first light emitting element electrode LDE1 is an anode, the second light emitting element electrode LDE2 may be used as a cathode, and when the first light emitting element electrode LDE1 is a cathode, the second light emitting element electrode LDE2 may be used as an anode.

The second light emitting element electrode LDE2 may be formed of a metal film, such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO). In some embodiments of the present disclosure, the second light emitting element electrode LDE2 may be formed of a multi-film, of a double film, or more including a metal thin film. For example, the second light emitting element electrode LDE2 may be formed of a triple-film of ITO/Ag/ITO.

The second light emitting element electrode LDE2 may be formed of a metal reflective film and/or a transparent conductive film when an image is to be provided in a lower direction of the substrate SUB. The second light emitting element electrode LDE2 may be formed of a transparent conductive film when an image is to be provided in an upper direction of the substrate SUB.

A set of the first light emitting element electrode LDE1, the emission film EML, and the second light emitting element electrode LDE2 described above may be referred to as a light emitting element.

The encapsulation film TFE may be provided on the second light emitting element electrode LDE2. The encapsulation film TFE may be formed as a single layer, but may also be formed as a multilayer. In some embodiments, the encapsulation film TFE may include first to third encapsulation films ENC1, ENC2, and ENC3. The first to third encapsulation films ENC1, ENC2, and ENC3 may be made of an organic material and/or an inorganic material. The third encapsulation film ENC3 disposed at the outermost may be made of an inorganic material. For example, the first encapsulation film ENC1 may be an inorganic film made of an inorganic material, the second encapsulation film ENC2 may be an organic film made of an organic material, and the third encapsulation film ENC3 may be an inorganic film made of an inorganic material. The inorganic material has less penetration of moisture and oxygen than the organic material, but is vulnerable to cracks due to its low elasticity or flexibility. Propagation of cracks may be prevented or reduced by forming the first encapsulation film ENC1 and the third encapsulation film ENC3 with an inorganic material and forming the second encapsulation film ENC2 with an organic material. Here, the layer made of the organic material, that is, the second encapsulation film ENC2, may be completely covered by the third encapsulation film ENC3 so that an end portion thereof is not exposed to the outside. The organic material may include an organic insulating material, such as a polyacrylic compound, a polyimide compound, a fluorine-based carbon compound such as Teflon, a benzocyclobutene compound, and/or the like. The inorganic material may include polysiloxane, a silicon nitride, a silicon oxide, a silicon oxynitride, and/or the like.

The emission film EML forming the light emitting element may be easily damaged by moisture or oxygen from the outside. The encapsulation film TFE protects the emission film EML by covering it. The encapsulation film TFE covers the display area DA, and may extend to the non-display area NDA outside the display area DA. However, although the insulating films made of an organic material are advantageous in terms of flexibility and elasticity, they may allow moisture and oxygen to permeate more easily than the insulating film made of an inorganic material. In some embodiments of the present disclosure, in order to prevent penetration of moisture or oxygen through the insulating films made of an organic material, the end portions of the insulating films made of an organic material may be covered by the insulating films made of an inorganic material, so as to not be exposed to the outside. For example, the first via film VIA1, the second via film VIA2, and pixel defining film PDL made of an organic material do not continuously extend to the non-display area NDA, and may be covered by the first encapsulation film ENC1. Accordingly, an upper surface of the pixel defining film PDL, the first via film VIA1, the second via film VIA2, and a side surface of the pixel defining film PDL are encapsulated by the encapsulation film TFE including an inorganic material, so that they may be prevented from exposure to the outside.

The encapsulation film TFE may be multi-layered. However, the material thereof is not limited thereto, and may be variously changed. For example, the encapsulation film TFE may include a plurality of organic material layers and a plurality of inorganic material layers alternately stacked.

A first sensing electrode layer ISM1 may be disposed on the encapsulation film TFE. In some embodiments, an additional buffer film may be disposed between the first sensing electrode layer ISM1 and the encapsulation film TFE. The first sensing electrode layer ISM1 may be formed of a metal film, such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO).

A first sensing insulating film ISI1 may be present on the first sensing electrode layer ISM1. The first sensing insulating film ISI1 may be an inorganic insulating film made of an inorganic material. The inorganic material may include an inorganic insulating material, such as polysiloxane, a silicon nitride, a silicon oxide, and/or a silicon oxynitride.

A second sensing electrode layer ISM2 may be present on the first sensing insulating film ISI1. The second sensing electrode layer ISM2 may be formed of a metal film, such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO).

Various suitable input detectors may be configured by using the first sensing electrode layer ISM1, the first sensing insulating film ISI1, and the second sensing electrode layer ISM2, which will be described later in FIG. 27 to FIG. 29.

In some embodiments of FIG. 25, the second sensing electrode layer ISM2 may be patterned to configure a first pattern IST1a of the first sensing wire IST1.

A second sensing insulating film ISI2 may be present on the second sensing electrode layer ISM2. The second sensing insulating film ISI2 may be formed of an organic film. For example, the organic film may include an organic insulating material, such as a polyacrylic compound, a polyimide compound, a fluorine-based carbon compound such as Teflon, a benzocyclobutene compound, and/or the like. For example, the second sensing insulating film ISI2 may be made of polymethyl methacrylate, polydimethylsiloxane, polyimide, acrylate, polyethylen terephthalate, or polyethylen naphthalate.

Hereinafter, the non-display area NDA, the first additional area ADA1, and the second additional area ADA2 will be described. In the cross-sectional view of FIG. 25, since the distinction between the non-display area NDA and the first additional area ADA1 is not a feature, the non-display area NDA and the first additional area ADA1 will not be separately described. Hereinafter, in the description of the non-display area NDA and the second additional area ADA2, the contents that are described above will be omitted or simply described to avoid duplication of description.

A dam DAM may be disposed at a boundary of the second encapsulation film ENC2. For example, the dam DAM may be disposed between a planarization film FLT and the second encapsulation film ENC2. The dam DAM may have a multi-layered structure, and for example, may include a first dam DAM1 and a second dam DAM2. For example, the first and second dams DAM1 and DAM2 may be made of an organic material. Each of the first and second dams DAM1 and DAM2 may correspond to one of the first via film VIA1, the second via film VIA2, and the pixel defining film PDL. For example, when the first dam DAM1 is made of the same or substantially the same material and made through the same or substantially the same process as the first via film VIA1, the second dam DAM2 may be made of the same or substantially the same material and made through the same or substantially the same process as the second via film VIA2 or the pixel defining film PDL. As another example, when the first dam DAM1 is made of the same or substantially the same material and made through the same or substantially the same process as the second via film VIA2, the second dam DAM2 may be made of the same or substantially the same material and made through the same or substantially the same process as the pixel defining film PDL. In addition, when a spacer is formed at (e.g., in or on) the pixel defining film PDL of the display area DA, the dam DAM may be formed by using the same or substantially the same material as the spacer.

The dam DAM may prevent or substantially prevent the organic material of the second encapsulation film ENC2, which has strong fluidity, from overflowing to the outside of the dam DAM during the process. The first and third encapsulation films ENC1 and ENC3, made of an inorganic material, cover the dam DAM and extend beyond it, thereby enhancing adhesion to the substrate SUB or other films on the substrate SUB.

The first pad PDE1 may be disposed on the substrate SUB, but may be spaced apart from the planarization film FLT. The first pad PDE1 may be supported by the second insulating film group ING2. Respective insulating films of the second insulating film group ING2 may correspond to respective insulating films of the first insulating film group ING1. The first pad PDE1 may include a first pad electrode PDE1a and a second pad electrode PDE1b. The first pad electrode PDE1a may be made of the same or substantially the same material as the first connection pattern CNP1. The second pad electrode PDE1b may be made of the same or substantially the same material as the second connection pattern CNP2.

The planarization film FLT may be disposed on the substrate SUB, but may be spaced apart from area covered by the encapsulation film TFE. The planarization film FLT may be an organic insulating film made of an organic material. The organic material may be an organic insulating material, such as a polyacrylic compound, a polyimide compound, a fluorine-based carbon compound such as Teflon, a benzocyclobutene compound, and/or the like.

In the present embodiment, the planarization film FLT may be formed after the interlayer insulating film ILD is formed and before the first connection pattern CNP1 is formed. Accordingly, the planarization film FLT and the first via film VIA1 may be formed through different processes. In some embodiments, the planarization film FLT and the first via film VIA1 may include different organic materials.

One end of the planarization film FLT may cover the first insulating film group ING1. In addition, a portion of the planarization film FLT corresponding to the second bending area BA2 may fill a first trench TCH1 between the first insulating film group ING1 and the second insulating film group ING2.

Since the inorganic insulating films have high hardness and low flexibility compared with the organic insulating films, the probability of occurrence of cracks is relatively high. When cracks occur in the inorganic insulating films, the cracks may propagate to wires on the inorganic insulating films, and eventually, cause defects such as wire breakage may occur.

In some embodiments, the inorganic insulating films may be removed from the second bending area BA2, so that the first trench TCH1 may be formed, and the first insulating film group ING1 and the second insulating film group ING2 may be divided. In some embodiments, all of the inorganic insulating films corresponding to an area of the first trench TCH1 are removed, but in some embodiments, some of the inorganic insulating films may remain. In this case, some remaining inorganic insulating films may include slits, thereby dispersing bending stress.

A second pattern IST1b of the first sensing wire IST1 may be extended on the planarization film FLT, and may be electrically connected to the first pad PDE1. In some embodiments, the second pattern IST1b may be made of the same or substantially the same material as the first connection pattern CNP1, and made through the same or substantially the same process.

A first wire protective film LPL1 may cover the planarization film FLT and the second pattern IST1b. In addition, a second wire protective film LPL2 may cover the first wire protective layer LPL1. In some embodiments, the configuration of the second wire protective film LPL2 may be omitted. The first and second wire protective films LPL1 and LPL2 may be made of an organic material. Each of the first and second wire protective films LPL1 and LPL2 may correspond to one of the first via film VIA1, the second via film VIA2, and the pixel defining film PDL. For example, when the first wire protective film LPL1 is made of the same or substantially the same material and made through the same or substantially the same process as the first via film VIA1, the second wire protective layer LPL2 may be made of the same or substantially the same material and made through the same or substantially the same process as the second via film VIA2 or the pixel defining film PDL. As another example, when the first wire protective film LPL1 is made of the same or substantially the same material and made through the same or substantially the same process as the second via film VIA2, the second wire protective layer LPL2 may be made of the same or substantially the same material and made through the same or substantially the same process as the pixel defining film PDL.

The first and second wire protective films LPL1 and LPL2 and the first sensing insulating film ISI1 may include a first opening OPN1 exposing the second pattern IST1b.

The first pattern IST1a may be connected to the second pattern IST1b through the first opening OPN1. According to some embodiments, a height of the second pattern IST1b disposed on one end of the first insulating film group ING1 and the planarization film FLT may be greater than a height of the second pattern IST1b disposed on the planarization film FLT corresponding to the first trench TCH1.

Accordingly, the first pattern IST1a and the second pattern IST1b may be directly connected without a bridge wire, and since there is no bridge wire, the connection reliability between the first pattern IST1a and the second pattern IST1b is improved. In addition, since a length of the non-display area NDA may be reduced by as much as a length of the bridge wire, it is possible to reduce a dead space and to realize a thin bezel.

A third pattern IST1c of the first sensing wire IST1 may connect the first pad PDE1 and the second pattern IST1b. The third pattern IST1c may be made of the same or substantially the same material and made by the same or substantially the same process as the gate electrode GE of the transistor. In some embodiments, the third pattern IST1c may be made of the same or substantially the same material and made by the same or substantially the same process as the upper electrode UE. In some embodiments, the odd-numbered third pattern IST1c may be formed of the same or substantially the same material and formed in the same or substantially the same process as the gate electrode GE of the transistor. In some embodiments, the even-numbered third pattern IST1c may be formed of the same or substantially the same material and formed in the same or substantially the same process as the upper electrode UE. Conversely, the even numbered third pattern IST1c may be formed of the same or substantially the same material and formed in the same or substantially the same process as the gate electrode GE of the transistor, and the odd numbered third pattern IST1c may be formed of the same or substantially the same material and formed in the same or substantially the same process as the upper electrode UE. Accordingly, a short circuit between adjacent wires may be more efficiently prevented.

The second insulating film group ING2 may include a second opening OPN2 exposing the third pattern IST1c. In addition, the planarization film FLT may include an opening corresponding to the second opening OPN2. The second pattern IST1b may be connected to the third pattern IST1c through the second opening OPN2.

Figure 26:
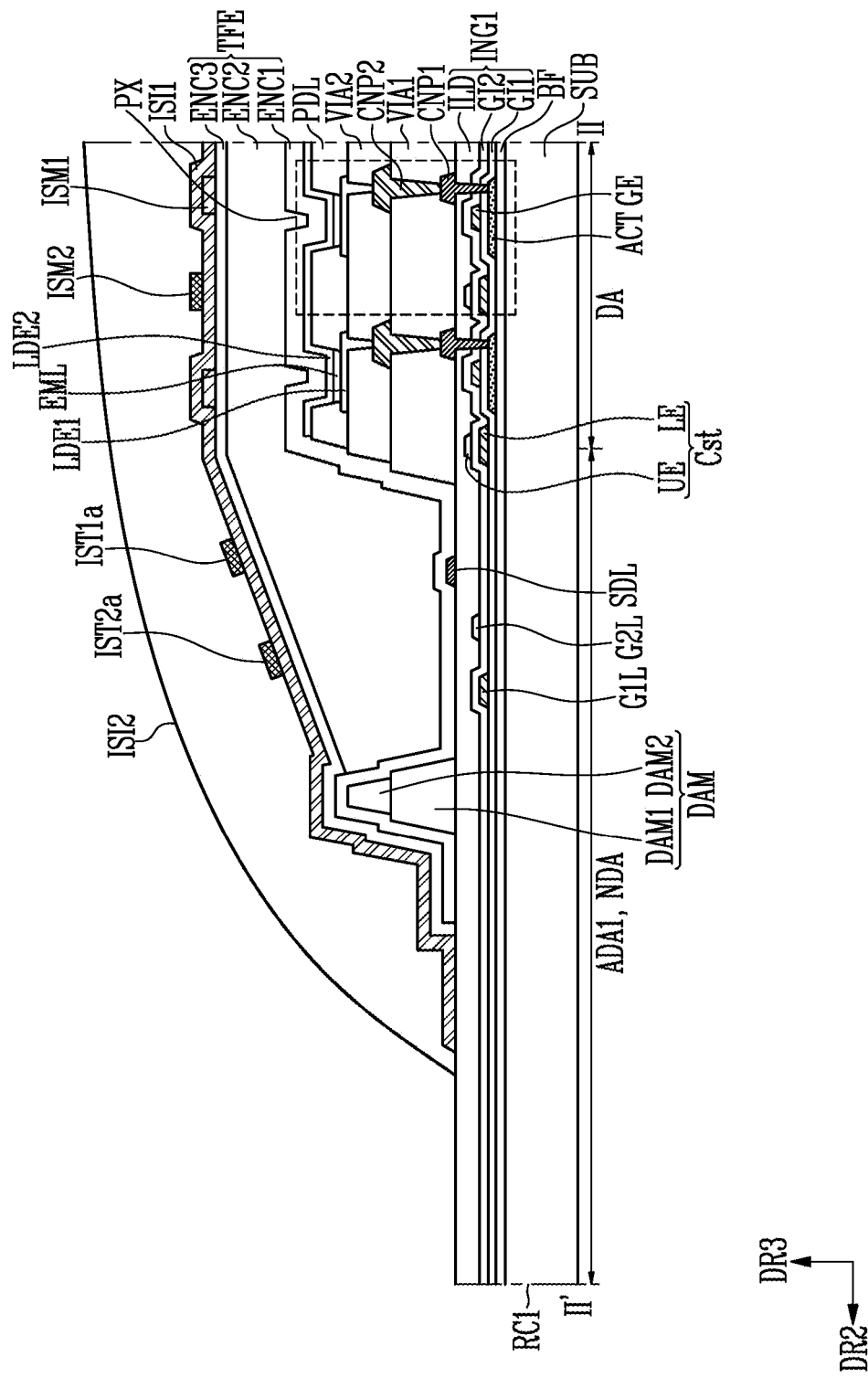

FIG. 26 is a cross-sectional view taken along line II-II' of FIG. 24.

The line II-II' of FIG. 24 may correspond to the first bending axis BX1. However, the same or substantially the same embodiment may be applied to not only the first lateral surface RC1 but also the second lateral surface RC2.

The display wires DST (see, e.g., FIG. 24) may be configured of a single-layered wire or a multi-layered wire by using at least one of wires G1L, G2L, and/or SDL. The wire G1L may be made of the same or substantially the same material and made by the same or substantially the same process as the gate electrode GE. The wire G2L may be made of the same or substantially the same material and made by the same or substantially the same process as the upper electrode UE. The wire SDL may be made of the same or substantially the same material and made by the same or substantially the same process as the first connection pattern CNP1.

The patterns IST1a and IST2a of the sensing wires IST1 and IST2 (see FIG. 24) may be disposed on the encapsulation film TFE and the first sensing insulating film ISI1 (based on the third direction DR3), and may be disposed between the dam DAM and the display area DA (based on the second direction DR2). The first sensing insulating film ISI1 may be disposed between the encapsulation film TFE and the sensing wires IST1 and IST2.

Figure 27:
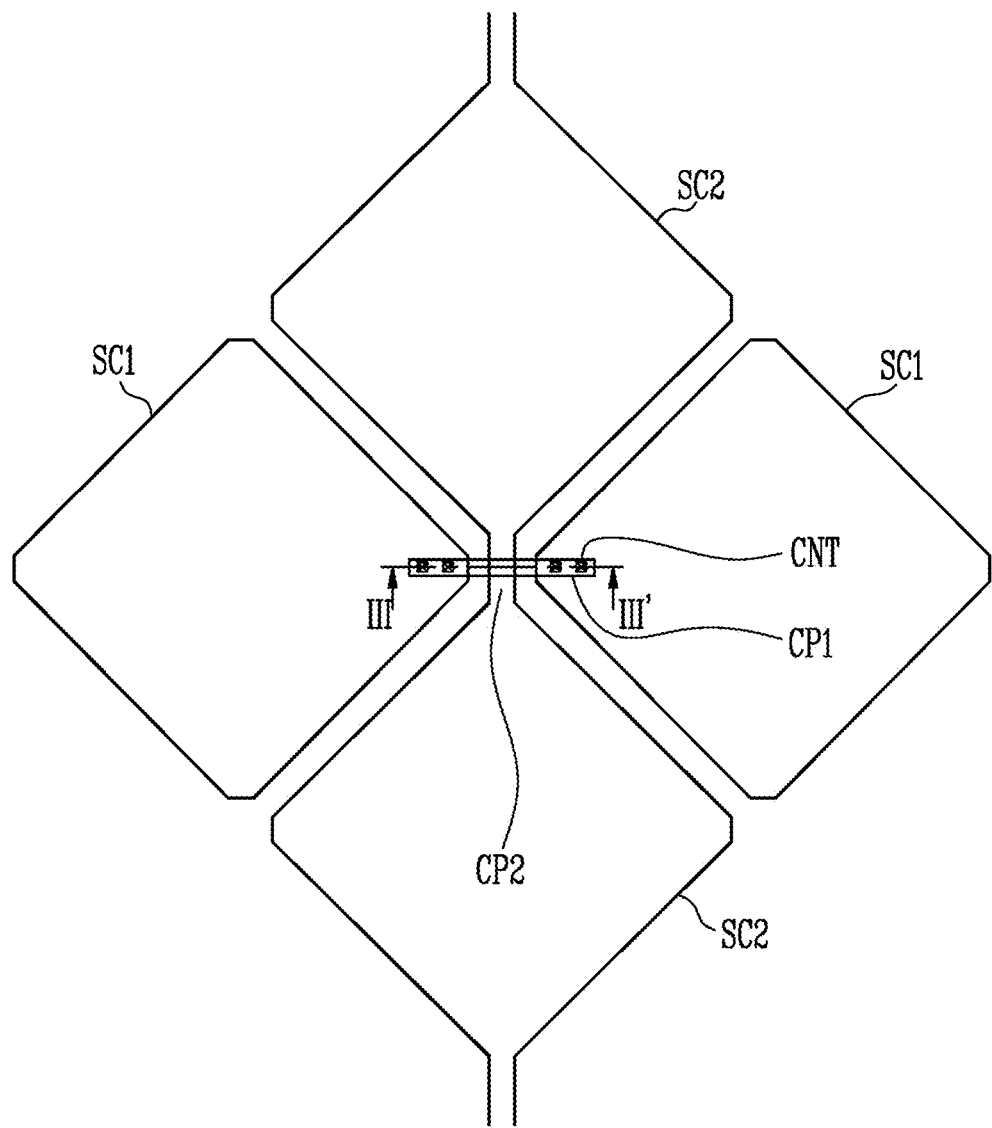
Figure 28:
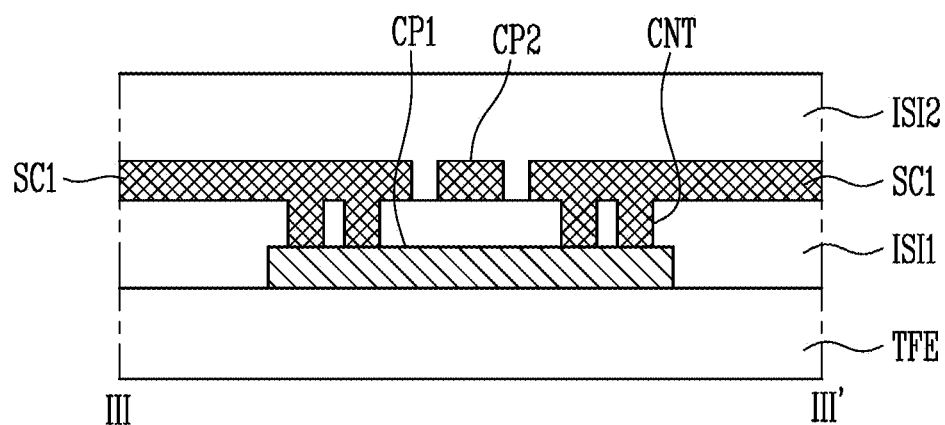

FIG. 27 and FIG. 28 illustrate sensing electrodes and bridge electrodes according to some embodiments of the present disclosure. FIG. 28 illustrates a cross-sectional view taken along line III-III' of FIG. 27.

Bridge electrodes CP1 may be disposed on the encapsulation film TFE by patterning the first sensing electrode layer ISM1.

The first sensing insulating layer ISI1 may cover the bridge electrode CP1, and may include contact holes CNT exposing some of the bridge electrodes CP1.

The first sensing electrodes SC1 and the second sensing electrodes SC2 may be formed at (e.g., in or on) the first sensing insulating film ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. Accordingly, a separate bridge electrode may not be necessary to connect the second sensing electrodes SC2.

In some embodiments, each of the sensing electrodes SC1 and SC2 may cover a plurality of pixels PX. When each of the sensing electrodes SC1 and SC2 are formed of an opaque conductive film, a plurality of openings may be included, through which the plurality of pixels PX to be covered may be exposed. For example, each of the sensing electrodes SC1 and SC2 may be configured in a mesh shape. When each of the sensing electrodes SC1 and SC2 is formed of a transparent conductive film, each of the sensing electrodes SC1 and SC2 may be formed in a form of a plate without an opening.

Figure 29:
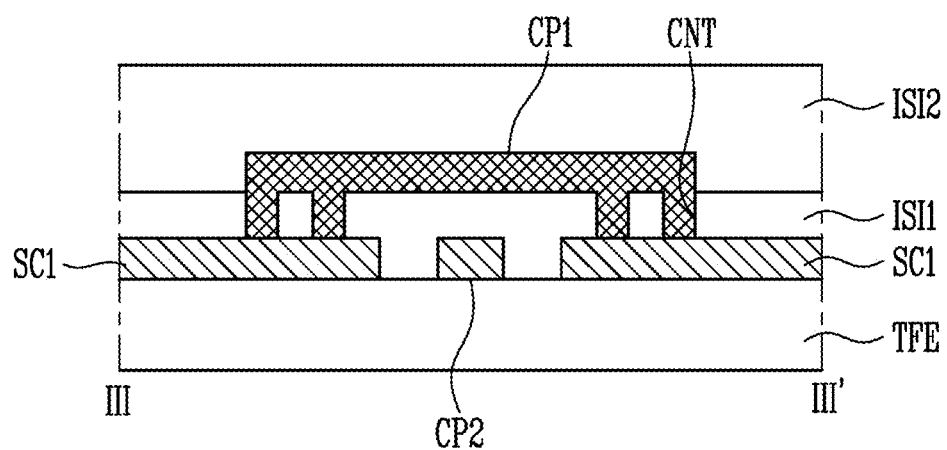

FIG. 29 illustrates sensing electrodes and bridge electrodes according to some embodiments of the present disclosure.

FIG. 29 illustrates another cross-sectional view taken along line III-III' of FIG. 27.

The first sensing electrodes SC1 and the second sensing electrodes SC2 may be formed by patterning the first sensing electrode layer ISM1 to be disposed on the encapsulation film TFE.

The first sensing insulating film ISI1 may cover the first sensing electrodes SC1 and the second sensing electrodes SC2, and may include the contact holes CNT exposing some of the first sensing electrodes SC1.

The bridge electrodes CP1 may be formed by patterning the second sensing electrode layer ISM2 (see, e.g., FIG. 26) to be disposed on the first sensing insulating film ISI1. The bridge electrodes CP1 may be connected to the first sensing electrodes SC1 through the contact holes CNT.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A sensor device comprising:
   a sensor layer including first sensors, and second sensors forming a capacitance with the first sensors; and
   a sensor driver configured to transmit driving signals to the first sensors, and receive sensing signals from the second sensors, during a touch sensing period,
   wherein the sensor driver is further configured to transmit first driving signals to at least some of the first sensors, and second driving signals to at least some of the second sensors, during an object sensing period different from the touch sensing period, and
   wherein during the object sensing period, the first driving signals applied to the first sensors located at an edge of the sensor layer are different from the first driving signals applied to the first sensors located at a central portion of the sensor layer in at least one of a voltage level, a frequency, a phase, or a code.

2. The sensor device of claim 1, wherein during the object sensing period, the second driving signals applied to the second sensors located at the edge of the sensor layer are different from the second driving signals applied to the second sensors located at the central portion of the sensor layer in at least one of a voltage level, a frequency, a phase, or a code.

3. The sensor device of claim 2, wherein during the object sensing period, the first driving signals applied to the first sensors located at the edge of the sensor layer have a higher signal-to-noise ratio (SNR) than that of the first driving signals applied to the first sensors located at the central portion of the sensor layer.

4. The sensor device of claim 2, wherein during the object sensing period, voltage levels of the first driving signals applied to the first sensors located at the edge of the sensor layer are different from voltage levels of the first driving signals applied to the first sensors located at the central portion of the sensor layer.

5. The sensor device of claim 4, wherein during the object sensing period, voltage levels of the first driving signals applied to the first sensors located at the edge of the sensor layer are greater than voltage levels of the first driving signals applied to the first sensors located at the central portion of the sensor layer.

6. The sensor device of claim 2, wherein during the object sensing period, phases of the first driving signals applied to the first sensors located at the edge of the sensor layer are different from phases of the first driving signals applied to the first sensors located at the central portion of the sensor layer.

7. The sensor device of claim 6, wherein during the object sensing period, a phase difference between the first driving signals applied to the first sensors located at the edge of the sensor layer is smaller than a phase difference between the first driving signals applied to the first sensors located at the central portion of the sensor layer.

8. The sensor device of claim 6, wherein during the object sensing period, phases of the first driving signals applied to the first sensors located at the edge of the sensor layer are set to cause more constructive interference than the phases of the first driving signals applied to the first sensors located at the central portion of the sensor layer.

9. The sensor device of claim 2, wherein during the object sensing period, frequencies of the first driving signals applied to the first sensors located at the edge of the sensor layer are different from frequencies of the first driving signals applied to the first sensors located at the central portion of the sensor layer.

10. The sensor device of claim 9, wherein during the object sensing period, frequencies of the first driving signals applied to the first sensors located at the edge of the sensor layer are set to cause more constructive interference than the frequencies of the first driving signals applied to the first sensors located at the central portion of the sensor layer.

11. The sensor device of claim 2, wherein during the object sensing period, codes of the first driving signals applied to the first sensors located at the edge of the sensor layer are different from codes of the first driving signals applied to the first sensors located at the central portion of the sensor layer.

12. The sensor device of claim 9, wherein during the object sensing period, codes of the first driving signals applied to the first sensors located at the edge of the sensor layer cause more constructive interference than those of codes of the first driving signals applied to the first sensors located at the central portion of the sensor layer.

13. A driving method of a sensor device comprising a sensor layer including first sensors, and second sensors forming a capacitance with the first sensors, the method comprising:
   applying first driving signals to at least some of the first sensors, the first driving signals applied to the first sensors located at an edge of the sensor layer being different from the first driving signals applied to the first sensors located at a central portion of the sensor layer in at least one of a voltage, a frequency, a phase, or a code; and
   applying second driving signals to at least some of the second sensors, the second driving signals applied to the second sensors located at the edge of the sensor layer being different from the second driving signals applied to the second sensors located at the central portion of the sensor layer in at least one of a voltage level, a frequency, a phase, or a code.

14. The driving method of the sensor device of claim 13, wherein the first driving signals applied to the first sensors located at the edge of the sensor layer have a higher signal-to-noise ratio (SNR) than that of the first driving signals applied to the first sensors located at the central portion of the sensor layer.

15. The driving method of the sensor device of claim 13, wherein voltage levels of the first driving signals applied to the first sensors located at the edge of the sensor layer are greater than voltage levels of the first driving signals applied to the first sensors located at the central portion of the sensor layer.

16. The driving method of the sensor device of claim 13, wherein a phase difference between the first driving signals applied to the first sensors located at the edge of the sensor layer is smaller than a phase difference between the first driving signals applied to the first sensors located at the central portion of the sensor layer.

17. The driving method of the sensor device of claim 13, wherein phases of the first driving signals applied to the first sensors located at the edge of the sensor layer are set to cause more constructive interference than phases of the first driving signals applied to the first sensors located at the central portion of the sensor layer.

18. The driving method of the sensor device of claim 13, wherein frequencies of the first driving signals applied to the first sensors located at the edge of the sensor layer are set to cause more constructive interference than frequencies of the first driving signals applied to the first sensors located at the central portion of the sensor layer.

19. The driving method of the sensor device of claim 13, wherein codes of the first driving signals applied to the first sensors located at the edge of the sensor layer are set to cause more constructive interference than codes of the first driving signals applied to the first sensors located at the central portion of the sensor layer.

20. The driving method of the sensor device of claim 13, wherein the at least one of the voltage, the frequency, the phase, or the code of the first driving signals applied to the first sensors located at the edge of the sensor layer cause more constructive interference than the at least one of the voltage, the frequency, the phase, or the code of the first driving signals applied to the first sensors located at the central portion of the sensor layer.

21. A sensor device comprising:
a sensor layer including first sensors, and second sensors crossing the first sensors; and
a sensor driver configured to transmit first driving signals to the first sensors, and receive sensing signals from the second sensors, during a first sensing period,
wherein the sensor driver is configured to transmit second driving signals different from the first driving signals to at least two of the first sensors during a second sensing period different from the first sensing period, and
wherein during the second sensing period, the second driving signal applied to the first sensor located at an edge of the sensor layer is different from the second driving signals applied to the first sensor located at a central portion of the sensor layer in at least one of a voltage level, a frequency, a phase, or a code.

22. The sensor device of claim 21, wherein:
the first driving signals are signals used to detect a position of a first object; and
the second driving signals are signals used to detect a position of a second object that is different from the first object.

* * * * *